(12) United States Patent
Kawamoto et al.

(10) Patent No.: US 6,357,224 B1
(45) Date of Patent: Mar. 19, 2002

(54) ENGINE EXHAUST GAS PURIFYING APPARATUS

(75) Inventors: Shigeru Kawamoto, Hitachi; Yutaka Takaku; Toshio Ishii, both of Mito; Yoshihisa Fujii, Hitachinaka; Shinji Nakagawa, Hitachinaka; Minoru Oosuga, Hitachinaka, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/592,677

(22) Filed: Jun. 12, 2000

(30) Foreign Application Priority Data

Jun. 10, 1999 (JP) .......................................... 11-163440

(51) Int. Cl.$^7$ ................................................. F01N 3/00
(52) U.S. Cl. ............................. 60/277; 60/285; 60/295; 60/301
(58) Field of Search .................... 60/285, 295, 277, 60/301, 311, 276

(56) References Cited

U.S. PATENT DOCUMENTS

| | | | | |
|---|---|---|---|---|
| 5,425,234 A | * | 6/1995 | Ohuchi et al. | 60/277 |
| 5,595,060 A | * | 1/1997 | Togai et al. | 60/277 |
| 5,924,280 A | * | 7/1999 | Tarabulski | 60/301 |
| 5,934,072 A | * | 8/1999 | Hirota et al. | 60/301 |
| 6,012,282 A | * | 1/2000 | Kato et al. | 60/277 |
| 6,026,640 A | * | 2/2000 | Kato et al. | 60/277 |
| 6,082,101 A | * | 7/2000 | Manaka et al. | 60/277 |
| 6,148,612 A | * | 11/2000 | Yamashita et al. | 60/277 |
| 6,161,378 A | * | 12/2000 | Hanaoka et al. | 60/295 |
| 6,167,695 B1 | * | 1/2001 | Itou et al. | 60/301 |

FOREIGN PATENT DOCUMENTS

JP 2692380 9/1997

* cited by examiner

*Primary Examiner*—Thomas Denion
*Assistant Examiner*—Diem Tran
(74) *Attorney, Agent, or Firm*—Crowell & Moring LLP

(57) ABSTRACT

The invention provides a method of controlling an air-fuel ratio and for diagnosing a deterioration of a catalyst having an NOx trapping agent in an internal combustion engine. An exhaust gas purifying apparatus having an NOx trapping agent arranged within an exhaust gas passage, an air-fuel ratio changing means temporarily changing the air-fuel ratio of the exhaust gas from the lean to the stoichiometric or rich air-fuel ratio at a predetermined cycle, a particular component detecting means detecting a particular component in the exhaust gas downstream the NOx trapping agent, a NOx discharge or reduction completion judging means, and NOx discharge or reduction completion time detecting means detecting a time required for purifying the NOx.

16 Claims, 20 Drawing Sheets

FIG. 4

TARGET TORQUE (TO)

TGAF(1,1) TGAF(1,2) ------ TGAF(1,n)

TGAF(2,1) TGAF(2,2) ------ TGAF(2,n)

TGAF(m,1) TGAF(m,2) ------ TGAF(m,n)

ROTATIONAL SPEED (NE)

FIG. 5

(1) AIR-FUEL RATIO SENSOR

RICH ↑
STOICHIOMETRIC
↓ LEAN afr
afl

TIME (2) ALPHA 1.0

TIME (1)

(2)

(1)

(2)

(3)

(1)

(2)

(1)

(2)

(3)

(1)

(2)

(3)

(1)

(2)

(3)

ENGINE EXHAUST GAS PURIFYING APPARATUS

BACKGROUND OF THE INVENTION

1. Field of the Invention

The present invention relates to an exhaust gas purifying apparatus for an engine.

2. Description of the Prior Art

There has been widely employed a so-called lean burn technique in which an amount of air is made excessive (hereinafter, refer to as a lean air-fuel ratio) in comparison with a theoretical air-fuel ratio (about 14.7, hereinafter, refer to as a stoichiometric air-fuel ratio) in order to improve a specific fuel consumption, thereby lean burning the fuel.

For example, there has been going to be spread a structure of realizing a lean burn having an air-fuel ratio of about 20 to 25 of a type injecting a fuel near a suction port of a suction tube portion (a port injection type), and a structure of realizing a significantly lean burn having an air-fuel ratio of about 40 to 50 by forming a stratified mixture of a type directly injecting a fuel into a cylinder (a cylinder internal injection type). In these techniques, it is possible to realize an improvement of a specific fuel consumption by a lean burn, that is, by increasing an amount of the suction air so as to reduce a pumping loss and a heat loss.

However, in the case of the combustion in accordance with the stoichiometric air-fuel ratio, it is possible to simultaneously oxidize and reduce HC, CO and NOx in the exhaust gas by a three way catalysis, however, in the lean burn, since the exhaust gas is under an oxygen excessive state, it is hard to reduce NOx. Accordingly, there has been known an exhaust gas purifying apparatus for an engine structured such that an NOx trapping agent for trapping the NOx in the exhaust gas when the air-fuel ratio of the exhaust gas is lean and discharging the NOx when the air-fuel ratio is rich (the fuel is excessive) is arranged within an exhaust gas passage so as to temporarily change the air-fuel ratio of the exhaust gas from a lean air-fuel ratio to a stoichiometric air-fuel ratio or a rich air-fuel ratio at a predetermined cycle, thereby discharging and reducing the NOx trapped by the NOx trapping agent.

In this kind of exhaust gas purifying apparatus, it is desirable for reducing the specific fuel consumption and a particular component such as an HC or the like in the exhaust gas to make the specific fuel consumption the stoichiometric air-fuel ratio or the rich air-fuel ratio only for a cycle corresponding to an amount of the trapped NOx. There has been suggested Japanese Patent No. 2,692,380 as a technique for judging a completion of discharging the NOx when making the air-fuel ratio the stoichiometric air-fuel ratio or the rich air-fuel ratio. The structure is made such as to judge that the discharge of NOx is completed when the air-fuel ratio detected by an air-fuel ratio sensor mounted downward an NOx absorbent is switched from a lean air-fuel ratio to a rich air-fuel ratio after the air-fuel ratio is switched from the lean air-fuel ratio to the stoichiometric air-fuel ratio or the rich air-fuel ratio. This matter is based on the matter that the HC or the CO in the exhaust gas flowing from an upstream side is consumed for reducing the NOx during the time when the NOx absorbed by the NOx absorbent is discharged and reduced even in the case that the air-fuel ratio upstream the NOx absorbent becomes the stoichiometric air-fuel ratio or the rich air-fuel ratio, so that the air-fuel ratio detected by the air-fuel ratio sensor mounted downstream the NOx absorbent becomes slightly lean and the air-fuel ratio detected by the air-fuel ratio sensor after the discharge and the reduction of the NOx trapped by the NOx absorbent are completed becomes rich.

However, a timing when an output of the air-fuel ratio sensor mounted downstream the NOx absorbent is switched from the lean air-fuel ratio to the rich air-fuel ratio is affected by the air-fuel ratio upstream the NOx absorbent even when the amount of the NOx trapped by the NOx absorbent is uniform. For example, even in the case that the amount of the NOx absorbed by the NOx absorbent is much, the HC or the CO flows inward from the upstream portion of the NOx absorbent over a discharging and reducing speed for the NOx absorbed by the NOx absorbent when making the air-fuel ratio at a time of temporarily changing the air-fuel ratio of the exhaust gas from the lean air-fuel ratio to the stoichiometric air-fuel ratio or the rich air-fuel ratio too rich for discharging and reducing the NOx absorbed by the NOx absorbent, so that the HC and the CO which are not consumed flow downstream. Accordingly, the air-fuel ratio detected by the air-fuel ratio sensor mounted downstream the NOx absorbent immediately shows the rich air-fuel ratio, and it is hard to diagnose a performance of the NOx absorbent. In order to prevent such a matter, it is necessary to set the air-fuel ratio upstream the NOx absorbent to a predetermined value.

However, since the air-fuel ratio upstream the NOx absorbent mentioned above is actually a control which is not performed on the basis of a feedback control, the air-fuel ratio is frequently shifted from a target value. Accordingly, it is hard to make the air-fuel ratio at a time of temporarily changing from the lean air-fuel ratio to the stoichiometric air-fuel ratio or the rich air-fuel ratio uniform so as to accurately diagnose the performance of the NOx absorbent. Then, at a time of diagnosing an NOx catalyst, it is desirable to employ a method of feedback controlling a control parameter such as the air-fuel ratio or the like at a time of switching the air-fuel ratio from the lean air-fuel ratio to the rich air-fuel ratio so that a time required before the discharge and reduction of the NOx is completed becomes a predetermined value.

Further, in order to quickly perform a diagnosis of the NOx catalyst, it is desirable to employ a method of determining a parameter such as the air-fuel ratio or the like at a time of a rich spike control on the basis of an operating state of the engine so that a threshold used at a time of comparing with a time for completion of the discharge or reduction of the NOx absorbed by the NOx absorbent becomes constant.

SUMMARY OF THE INVENTION

In order to solve the problems and achieve the desires mentioned above, in accordance with the present invention, there is provided an engine exhaust gas purifying apparatus comprising:

an NOx trapping agent arranged within an exhaust gas passage, trapping an NOx in an exhaust gas in accordance with an adsorption or an absorption when an air-fuel ratio in the exhaust gas is lean and discharging or reducing the NOx when the air-fuel ratio is a stoichiometric air-fuel ratio or the rich air-fuel ratio;

air-fuel ratio changing means temporarily changing the air-fuel ratio of the exhaust gas from the lean air-fuel ratio to the stoichiometric air-fuel ratio or the rich air-fuel ratio at a predetermined cycle;

particular component detecting means detecting a particular component in the exhaust gas downstream the NOx trapping agent;

NOx discharge or reduction completion judging means judging on the basis of a detecting result of the particular component detecting means at a time of temporarily changing the air-fuel ratio of the exhaust gas to the stoichiometric air-fuel ratio or the rich air-fuel ratio by the air-fuel ratio changing means that a discharge or reduction of the NOx trapped by the NOx trapping agent is completed; and NOx discharge or reduction completion time detecting means detecting a time required for purifying the NOx, wherein a control parameter of the air-fuel ratio changing means is changed on the basis of a result obtained by comparing a time (TD) detected by the NOx discharge or reduction completion time detecting means with a predetermined value (TTD) previously set.

Further, in accordance with the present invention, there is provided an engine exhaust gas purifying apparatus comprising:

an NOx trapping agent arranged within an exhaust gas passage, trapping an NOx in an exhaust gas in accordance with an adsorption or an absorption when an air-fuel ratio in the exhaust gas is lean and discharging or reducing the NOx when the air-fuel ratio is a stoichiometric air-fuel ratio or the rich air-fuel ratio;

air-fuel ratio changing means temporarily changing the air-fuel ratio of the exhaust gas from the lean air-fuel ratio to the stoichiometric air-fuel ratio or the rich air-fuel ratio at a predetermined cycle;

particular component detecting means detecting a particular component in the exhaust gas downstream the NOx trapping agent;

NOx discharge or reduction completion judging means judging on the basis of a detecting result of the particular component detecting means at a time of temporarily changing the air-fuel ratio of the exhaust gas to the stoichiometric air-fuel ratio or the rich air-fuel ratio by the air-fuel ratio changing means that a discharge or reduction of the NOx trapped by the NOx trapping agent is completed; and NOx discharge or reduction completion time detecting means detecting a time required for purifying the NOx, wherein the engine exhaust gas purifying apparatus further comprises NOx trapping agent performance judging means for judging a performance of the NOx trapping agent on the basis of a result obtained by comparing a time (TD) detected by the NOx discharge or reduction completion time detecting means with a predetermined value (TTD) previously set, and a control parameter of the air-fuel ratio changing means is previously set on the basis of a parameter indicating an operating state of the engine.

Further, in accordance with the present invention, there is provided an engine exhaust gas purifying apparatus as cited in the structure mentioned above, wherein a difference between the values TD and TTD is made small at a time of changing the control parameter of the air-fuel ratio changing means on the basis of the result of comparison between the detected time TD and the predetermined value TTD.

Further, in accordance with the present invention, there is provided an engine exhaust gas purifying apparatus as cited in the structure mentioned above, wherein the control parameter of the air-fuel ratio changing means is set so that the predetermined value TTD becomes a fixed value without relation to an operating state.

Further, in accordance with the present invention, there is provided an engine exhaust gas purifying apparatus as cited in the structure mentioned above, wherein as the control parameter of the air-fuel ratio changing means, at least one of an air-fuel ratio at a time of temporarily changing to the stoichiometric air-fuel ratio or the rich air-fuel ratio, a cycle for temporarily changing the air-fuel ratio from the lean air-fuel ratio to the stoichiometric air-fuel ratio or the rich air-fuel ratio and a term for temporarily changing the air-fuel ratio to the stoichiometric air-fuel ratio or the rich air-fuel ratio is made variable.

Further, in accordance with the present invention, there is provided an engine exhaust gas purifying apparatus as cited in the structure mentioned above, wherein a time that the detected value detected by the particular component detecting means is smaller than the predetermined value is defined as the NOx discharge or reduction completion time.

Further, in accordance with the present invention, there is provided an engine exhaust gas purifying apparatus as cited in the structure mentioned above, wherein a time that the detected value detected by the particular component detecting means is smaller than a first predetermined value and larger than a second predetermined value is defined as the NOx discharge or reduction completion time.

Further, in accordance with the present invention, there is provided an engine exhaust gas purifying apparatus as cited in the structure mentioned above, wherein a deterioration of the NOx trapping agent is detected on the basis of the value of the control parameter of the air-fuel ratio changing means.

Further, in accordance with the present invention, there is provided an engine exhaust gas purifying apparatus as cited in the structure mentioned above, further comprising at least one of storing means for storing a code expressing a deterioration of the NOx trapping agent when a detected deterioration of the NOx trapping agent is equal to or more than a predetermined value, and alarm generating means for generating an alarm.

Further, in accordance with the present invention, there is provided an engine exhaust gas purifying apparatus as cited in the structure mentioned above, wherein a lean operation is limited in correspondence to a detected deterioration of the NOx trapping agent.

BRIEF DESCRIPTION OF THE DRAWINGS

FIG. 4 is a map which shows a basic fuel injection amount;

FIG. 5 is a schematic view which shows an air-fuel ratio feedback control;

DESCRIPTION OF THE PREFERRED EMBODIMENTS

A description will be given of an embodiment in accordance with the present invention with reference to the accompanying drawings.

Figure 1:
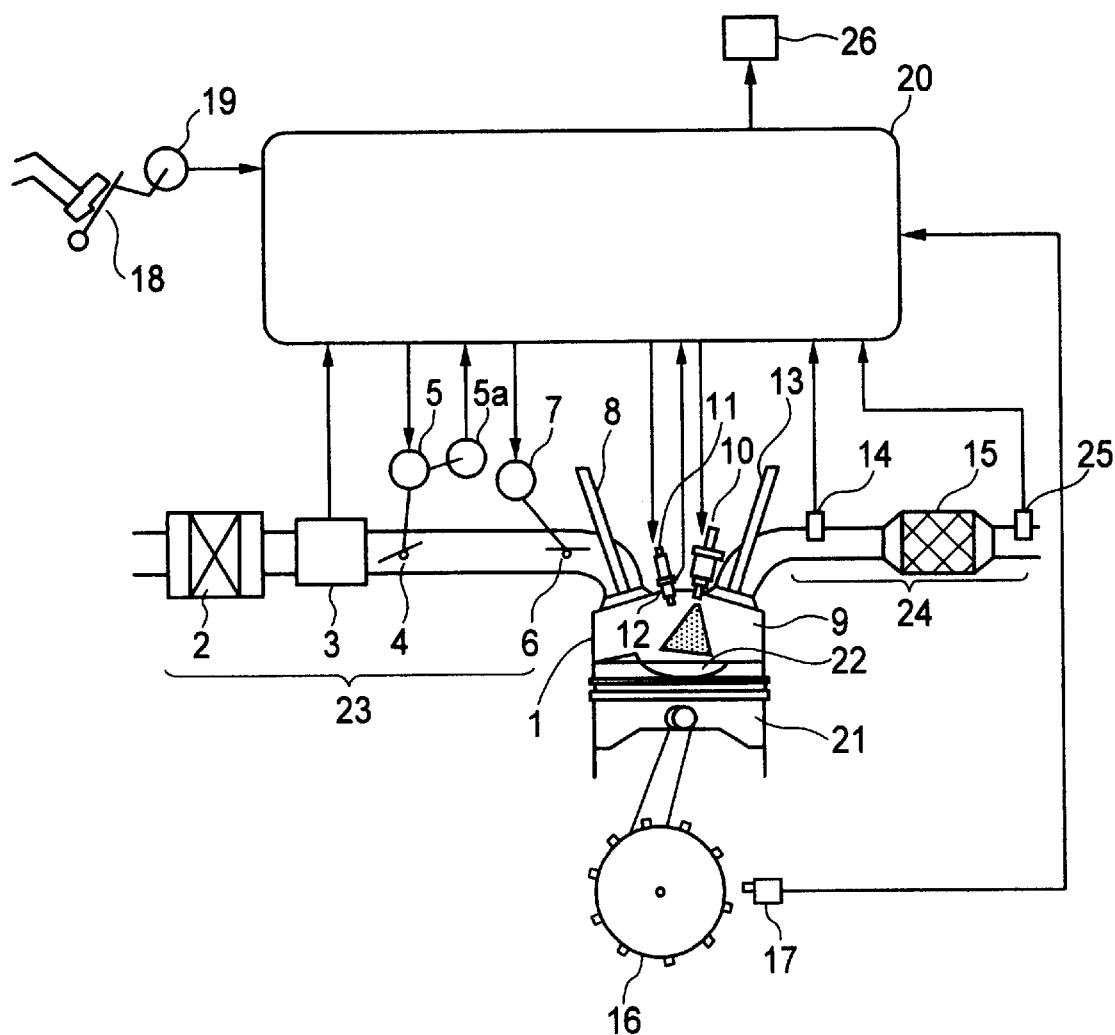
FIG. 1 is a schematic view which shows a whole structure of an engine exhaust gas purifying apparatus.

FIG. 1 is a schematic view of an air-fuel ratio control apparatus for an engine in accordance with an embodiment of the present invention. In this case, the present embodiment is an embodiment of a cylinder internal injection type. A suction system 23 of an engine 1 is provided with an air cleaner 2, an air flow sensor 3 for detecting an amount of suction air, a throttle valve 4 for adjusting an amount of suction air, throttle valve driving means 5, a throttle opening degree sensor 5a, a swirl control valve 6, swirl control valve driving means 7 and a suction valve 8. The swirl control valve 6 is provided immediately in front of the suction valve 8 with respect to each of the cylinders, and is structured such as to be integrally operated. A combustion chamber 9 for the engine 1 is provided with a fuel injection valve 10 for directly injecting a fuel within the combustion chamber 9, an ignition plug 11 and a cylinder internal pressure sensor 12. An exhaust system 23 of the engine 1 is provided with an exhaust valve 13, a first air-fuel ratio sensor 14, an NOx trapping agent 15 and a second air-fuel ratio sensor 25.

Further, there are provided a sensing plate 16 mounted to a crank shaft of the engine 1, a crank angle sensor 17 for detecting a rotational speed and a crank angle by detecting a protruding portion of the sensing plate 16, and an accelerator sensor 19 for detecting a pedaling amount of an accelerator pedal 18.

A detected value of each of the sensors is input to an electronic control unit (hereinafter, refer to as an ECU) 20, and the ECU 20 detects and calculates a pedaling amount of the accelerator pedal, an amount of a suction air, a rotational speed, a crank angle, a cylinder internal pressure, a throttle opening degree and the like. Then, on the basis of the result thereof, the ECU 20 calculates an amount and a feed timing of a fuel supplied to the engine 1 so as to output a drive pulse to the fuel injection valve 10, calculates an opening degree of the throttle valve 4 so as to output a control signal to the valve driving means 5, and calculates an ignition timing and the like so as to output an ignition signal to the ignition plug 11. Further, for example, in the case of judging that the NOx trapping agent 15 is deteriorated, the ECU 20 outputs a signal applied to an alarm lamp 26 for giving an alarm to a driver.

The fuel is pressure fed from a fuel tank (not shown) by a fuel pump, is kept at a predetermined pressure (about 5 to 15 MPa) by a fuel pressure regulator, and is supplied to the fuel injection valve 10. A predetermined amount of fuel is directly injected to the combustion chamber 9 at a predetermined timing in accordance with a driving pulse output by the ECU 20. As an operation mode of the engine 1, there are a stoichiometric operation, a uniform lean operation, a stratified lean operation and the like. At a time of the uniform lean operation, the fuel is injected at a suction stroke so as to be mixed with an air, whereby an uniform mixture is burned. At a time of the stratified lean operation, the fuel is injected at a compression stroke so as to distribute the fuel into the mixture in a layered manner, whereby the fuel is collected near the ignition plug 11 (forms a rich mixture).

The suction air adjusted by the throttle valve 4 flows into the combustion chamber via the suction valve 8. At this time, a swirl strength is controlled by the swirl control valve 6. In general, the swirl strength is set so that the swirl strength is high at a time of the stratified lean operation and the uniform lean operation, and the swirl strength is low at the other times. Particularly, at a time of the stratified operation, the fuel is collected near the ignition plug 11 without being spread to a whole of the combustion chamber 9, due to an air fluidization caused by the fuel injection timing and the swirl mentioned above and a shape of a cavity 22 provided on an upper surface of a piston 21.

The mixture of the fuel and the suction air is ignited by the ignition plug 9 so as to burn. An exhaust gas after combustion is discharged or reduced to an exhaust system 24 through the exhaust valve 13. The exhaust gas flows into the NOx trapping agent 15 arranged in the exhaust system 24.

The first air-fuel ratio sensor 14 outputs a signal corresponding to a concentration of an oxygen within the exhaust gas in an upstream portion of the NOx trapping agent 15, and can detect an actual air-fuel ratio on the basis of the output. An air-fuel ratio of the mixture supplied so as to achieve a target air-fuel ratio is feedback controlled on the basis of the actual air-fuel ratio detected by the first air-fuel ratio sensor 14.

The second air-fuel ratio sensor 25 outputs a signal corresponding to a concentration of an oxygen within the exhaust gas in a downstream portion of the NOx trapping agent 15, and can detect an actual air-fuel ratio on the basis of the output. An amount of NOx trapped in the NOx trapping agent 15 is judged on the basis of the actual air-fuel ratio detected by the second air-fuel ratio sensor 25.

Figure 2:
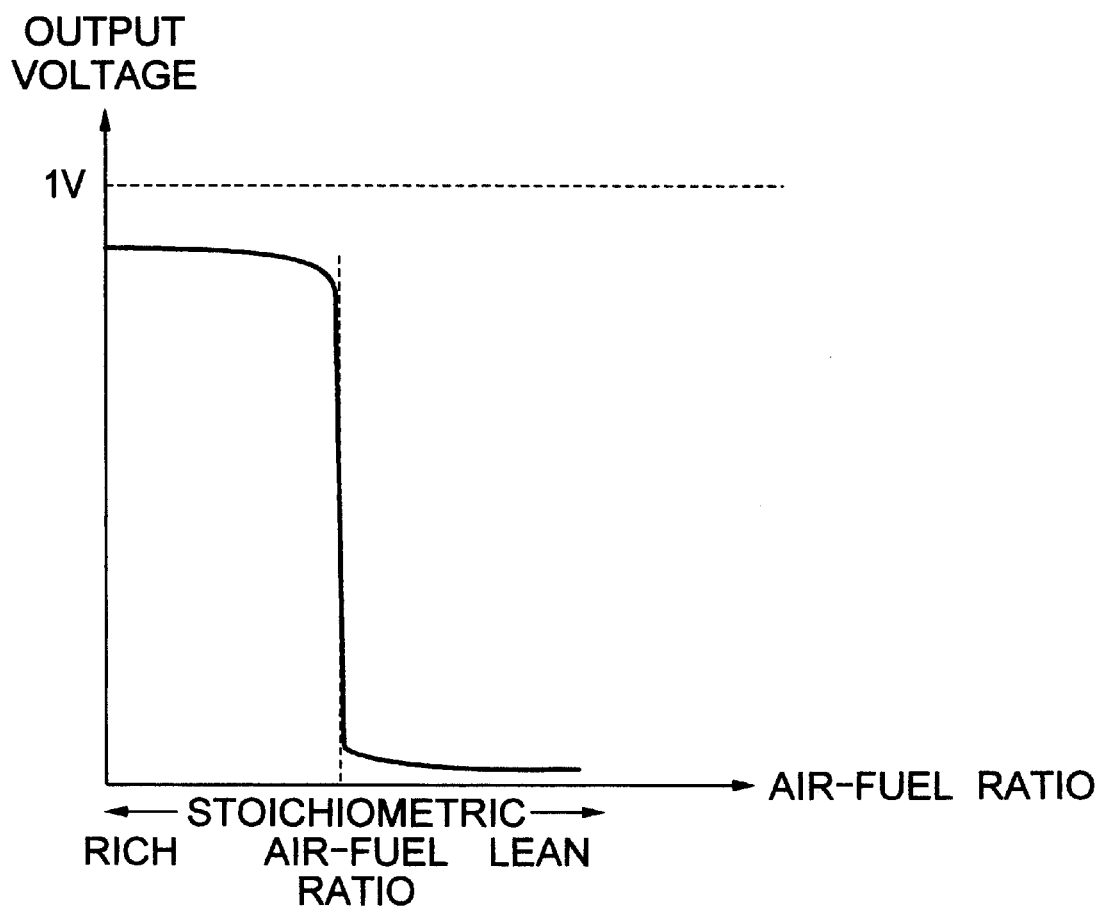
FIG. 2 is a graph which shows an example of an output of an air-fuel ratio sensor.

In accordance with the present embodiment, a so-called $O_2$ sensor in which the air-fuel ratio suddenly changes near the stoichiometric air-fuel ratio as shown in FIG. 2 so as to output a binary value is employed for the second air-fuel ratio sensor 25, however, the sensor is not limited to this. For example, a so-called wide range air-fuel ratio sensor which generates a substantially linear output in accordance with the air-fuel ratio on the basis of a concentration of oxygen within the exhaust gas may be employed.

In this case, a passage (not shown) and an EGR valve are provided between the exhaust system 24 and the suction system 23. In particular, at a time of the stratified operation, a large amount of EGR is introduced for restricting the generation of the NOx and the combustion speed.

Figure 3:
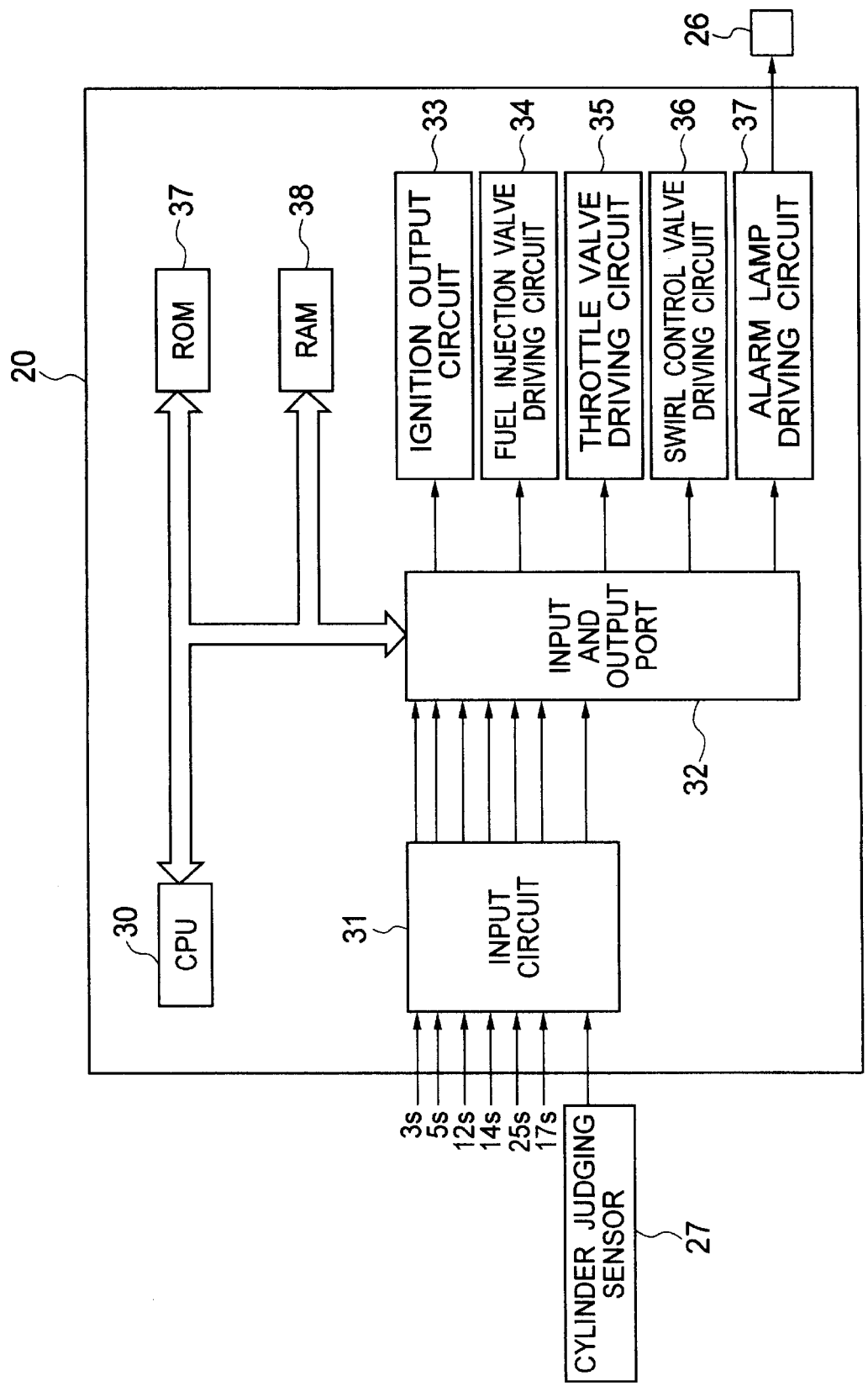
FIG. 3 is a block diagram which shows an electronic control circuit.

FIG. 3 shows a structure of the ECU 20. Respective signals 3s, 5s, 12s, 14s, 25s and 17s of the air flow sensor 3, the throttle valve opening degree sensor 5a, the cylinder internal pressure sensor 12, the first air-fuel ratio sensor 14, the second air-fuel ratio sensor 25 and the crank angle sensor 17 mentioned above, and a signal of a cylinder judging sensor 27 (not shown) are input to an input circuit 31. A CPU 30 reads these input signals via an input and output port 32 on the basis of a program and a constant stored in a ROM 37 so as to perform a calculating process.

Further, as a result of the calculating process, an ignition timing, a width and a timing of an injector driving pulse, a throttle valve opening degree command and a swirl control valve opening degree command are output from the CPU 30 to an ignition output circuit 33, a fuel injection valve driving circuit 34, a throttle valve driving circuit 35 and a swirl control valve driving circuit 36 via the input and output port 32, so that an ignition, a fuel injection, a throttle valve opening degree control and a swirl control valve opening degree control are executed. Further, for example, when judging that the NOx trapping agent 15 is deteriorated, the alarm lamp 26 is turned on by an alarm lamp driving circuit 37. A RAM 38 is employed for storing a value of the input signal, a result of calculation and the like.

The stratified and uniform lean operation, the stoichiometric operation and the like are executed in accordance with a rotational speed of the engine 1, a load and the like on the basis of a program and a constant stored in the ROM 37. In the stoichiometric operation, a feedback control is performed on the basis of an actual air-fuel ratio detected by the first air-fuel ratio sensor 14 so that the air-fuel ratio becomes a stoichiometric air-fuel ratio. At a time of the lean operation, the NOx is trapped in the NOx trapping agent 15. When the NOx trapping amount becomes a predetermined amount (at a predetermined cycle), the air-fuel ratio is switched to the stoichiometric air-fuel ratio or the rich air-fuel ratio in which a concentration of oxygen is low, and the NOx trapped in the NOx trapping agent 15 due to an adsorption, an absorption or the like is discharged so as to be reduced by HC or CO within the exhaust gas. Here, in the case of the cylinder internal injection type engine in accordance with the present invention, the air-fuel ratio is changed by operating the throttle valve 6 in a closing direction mainly by means of the throttle valve driving means 5 when switching the air-fuel ratio to the stoichiometric air-fuel ratio or the rich air-fuel ratio, however, the structure is not limited to this kind of method.

The NOx trapping agent 15 is structured such as to commonly have a so-called three way catalyst function for securing the NOx trapping performance at the lean time and the exhaust gas purifying performance at the stoichiometric air-fuel ratio time. For example, an alumina is employed as a carrier, and an alkaline metal such as a sodium Na, a barium Ba or the like, an alkaline earth metal and a noble metal such as a platinum Pt and a rhodium Rh are carried. Further, there is a structure in which a cerium Ce having an oxygen storage capacity is carried for improving a so-called three way catalyst performance in the stoichiometric air-fuel ratio. The NOx trapping agent 15 traps the NOx when the air-fuel ratio of the exhaust gas flowing thereinto is lean, and discharges or reduces the trapped NOx when the concentration of oxygen within the exhaust gas is reduced (for example, in the case of becoming the stoichiometric air-fuel ratio or the rich air-fuel ratio). The discharged or reduced NOx is reacted with HC and CO within the exhaust gas, for example, due to the catalyst operation of the platinum Pt so as to be reduced. In the manner mentioned above, it is possible to reduce an amount of the NOx discharged or reduced to the open air. Further, during the stoichiometric operation, since HC and CO within the exhaust gas is oxidized and NOx therewithin is reduced, for example, due to the catalyst operation of the platinum Pt, it is possible to reduce these injurious component. In this case, some kinds of NOx trapping agents have an effect of reducing a part of NOx by HC and CO within the exhaust gas even when the air-fuel ratio of the exhaust gas flowing thereinto is lean.

Next, a description will be given of an example of a method of calculating the injection amount of the fuel supplied to the engine 1. In the cylinder internal injection engine, a fuel injection amount TF is, for example, calculated with using the following formula.

$$TF = (QA/NE) \times (1/TGAF) \times K \times ALPHA \times RSA$$

In the above formula, QA is a suction air amount, NE is an engine rotational speed, TGAF is a target air-fuel ratio, K is a correction modulus with taking a characteristic of an injector or the like into consideration, ALPHA is a feedback correction modulus and RSA is an air-fuel ratio correction modulus at a rich spike time.

The target air-fuel ratio TGAF is a modulus used at a time of controlling the air-fuel ratio of the mixture supplied within the cylinder, and in the case that TGAF equals to 14.7, the air-fuel ratio supplied within the engine cylinder is the stoichiometric air-fuel ratio. On the contrary, in the case that TGAF is larger than 14.7, the air of the mixture supplied within the engine cylinder is excessive in comparison with the stoichiometric air-fuel ratio, and the mixture becomes the lean air-fuel ratio. Further, in the case that TGAF is smaller than 14.7, the fuel of the mixture supplied within the engine cylinder is excessive in comparison with the stoichiometric air-fuel ratio, and the mixture becomes the rich air-fuel ratio. In this case, the target air-fuel ratio TGAF can be determined by referring to a map having axes of an engine rotational speed NE and a target torque TO as shown in FIG. 4. The map in FIG. 4 is stored within the ROM 37 within the ECU 20.

The feedback modulus ALPHA is used for accurately coinciding the air-fuel ratio with the target value on the basis of the output signal of the air-fuel ratio sensor 14 in the case that TGAF equals to 14.7, that is, in the case of accurately setting the mixture supplied within the engine cylinder to the stoichiometric air-fuel ratio. A relation between an output value of the air-fuel ratio sensor 14 and an output value of ALPHA can be expressed as in FIGS. 5(1) and 5(2), and when the air-fuel ratio sensor output becomes rich, ALPHA is reduced, and when the air-fuel ratio sensor output becomes inversely lean, ALPHA is increased. In this case, in the case that TGAF does not equal to 14.7, a value of ALPHA is fixed to 1. The air-fuel ratio correction modulus RSA is set to a value slightly smaller than 1 at a time of setting the target air-fuel ratio to a value slight richer than the stoichiometric air-fuel ratio for the purpose of effectively purifying the NOx trapped in the NOx trapping agent 15 immediately after switching the air-fuel ratio from the lean air-fuel ratio to the rich air-fuel ratio in the case that TGAF equals to 14.7. A method of setting RSA will be mentioned below, however, a value of RSA is 1 at a normal time.

Figure 6:
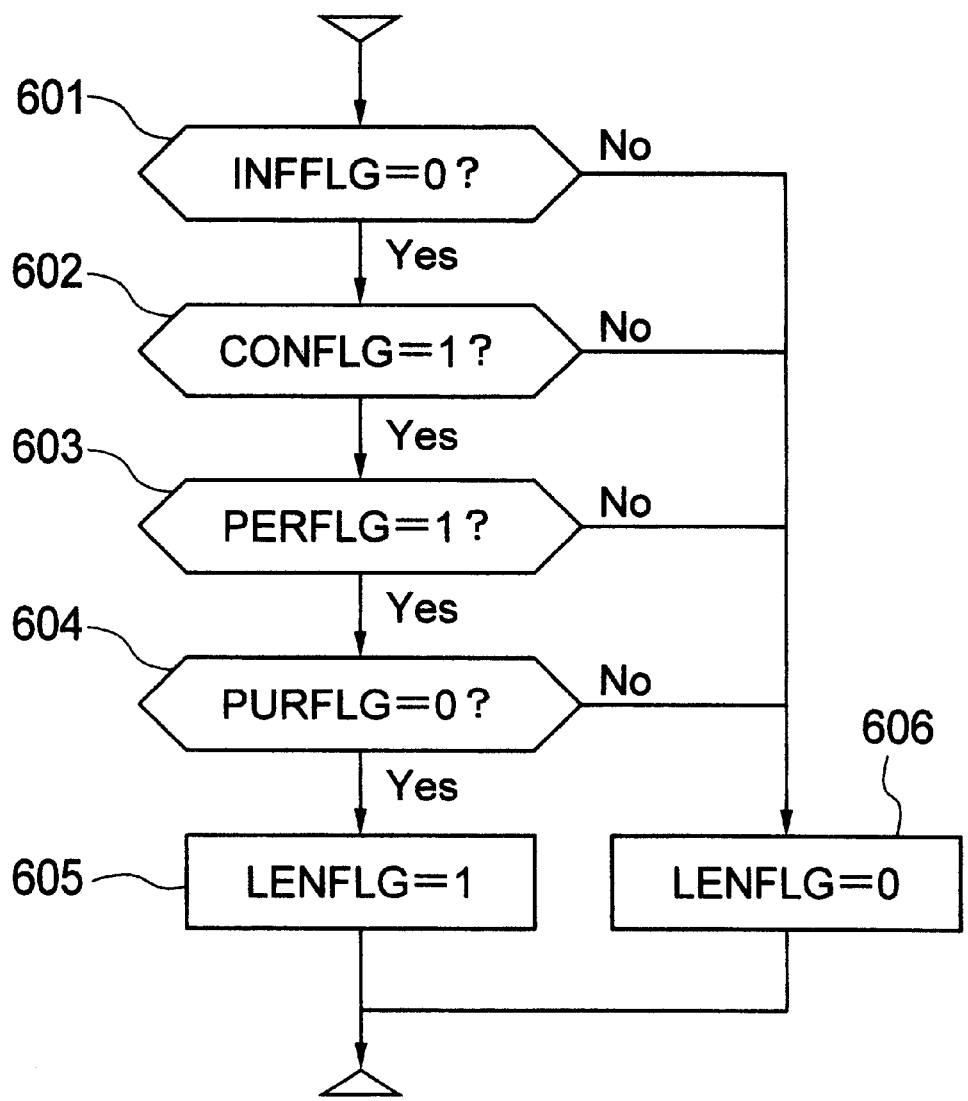
FIG. 6 is a flow chart which shows an embodiment of a method of determining whether or not a stratified operation should be allowed.
Figure 7:
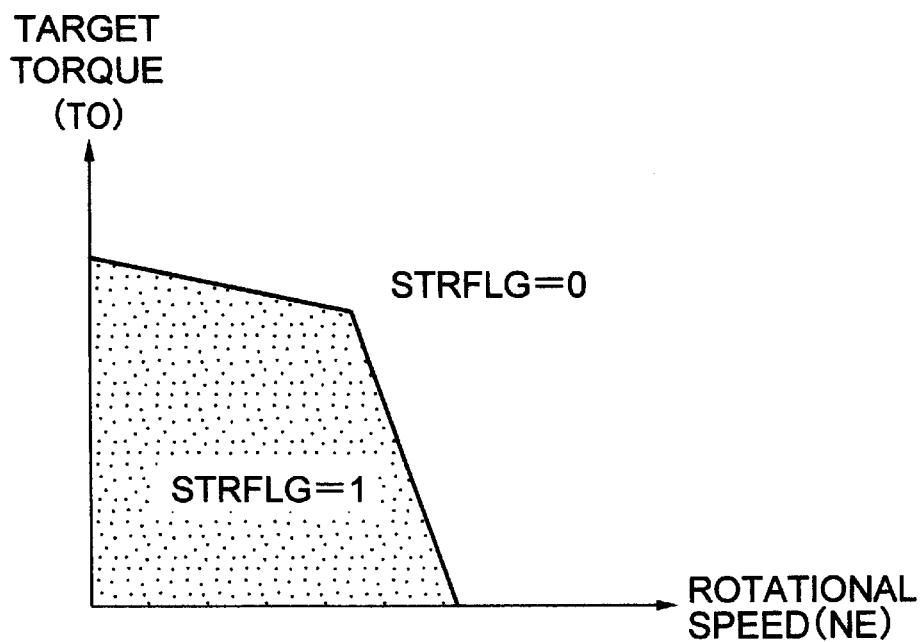
FIG. 7 is a map which shows an operation area allowing a stratified operation.
Figure 7:
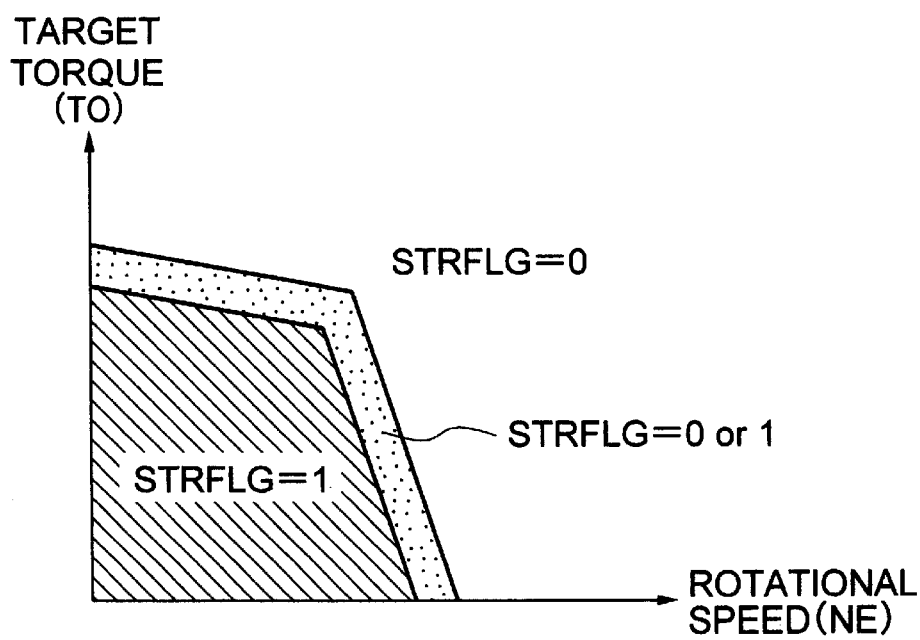

FIG. 6 shows a flow chart which shows a standard for starting the stratified operation in which the air-fuel ratio of the exhaust gas is lean, in the cylinder internal injection type engine. In a step 601, it is judged whether a flag INFFLG expressing whether or not the NOx trapping agent 15 is deteriorated equals to 0. If the relation INFFLG=0 is established, the NOx trapping agent 15 is not deteriorated, so that the step goes to a step 602. If the relation INFFLG=1 is established, the NOx trapping agent 15 is deteriorated, so that in order to inhibit the stratified operation, the relation LENFLG=0 is set in a step 606. In the step 602, it is judged whether or not a flag CONFLG=1 is satisfied, in which the flag CONFLG expresses whether or not the current operation condition is in an operation area in which the stratified operation can be performed. The stratified operation can be generally realized in an area having a low rotation and a low load, however, it is desirable to employ a method of setting an engine rotational speed NE and a target torque TO to axes and using a map stored in the ROM 37, as a method of judging whether or not the relation CONFLG=1 is established. An example of the map is shown in FIG. 7(1). In this case, as shown in FIG. 7(2), it is also possible to employ a method of changing a map to be referred in accordance whether or not the current operation state is a stratified operation. If the relation CONFLG=1 is established, the step goes to a step 603, and if the relation CONFLG=0, the relation LENFLG=0 is set in a step 606 so as to inhibit the stratified operation. In the step 603, it is judged whether or not the relation PERFLG=1 is established, in which PERFLG is a flag expressing whether or not all the stratified operation allowing conditions are satisfied. The stratified operation allowing condition means a condition necessary for previously preventing the combustion state and the exhaust gas from being deteriorated for performing the stratified operation, such as conditions that an operation of the EGR is good, a water temperature is within a proper range, an operation of the SCV is good and the like, of course these do not mean all of such conditions. If the relation PERFLG=1 is established, the step goes to a step 604, it is judged whether or not the relation PURFLG=0 is established, in which PURFLG is a flag expressing whether or not a requirement for purifying the NOx absorbed by the NOx trapping agent is generated. On the contrary, if the relation PERFLG=0 is established, the step goes to the step 606 and the relation LENFLG=0 is set so as to inhibit the stratified operation. In the step 604, if the relation PURFLG=0 is established, the relation LENFLG=1 is set so as to allow the stratified operation in the step 605. On the contrary, in the step 604, if the relation PERFLG=1 is established, the step goes to the step 605 and the relation LENFLG=0 is set so as to inhibit the stratified operation.

Figure 8:
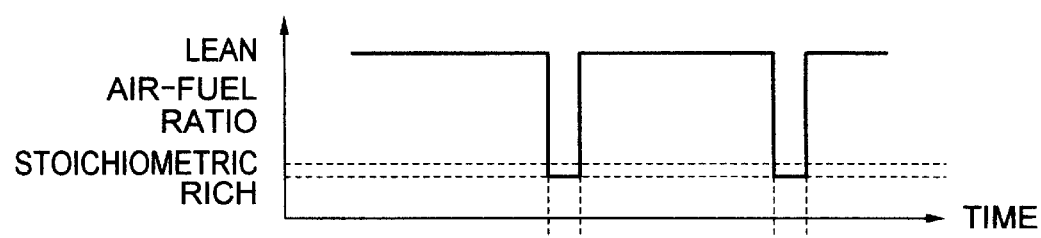
FIG. 8 is a characteristic view which shows a relation among an air-fuel ratio, an NOx purifying rate and an air-fuel ratio sensor.
Figure 8:
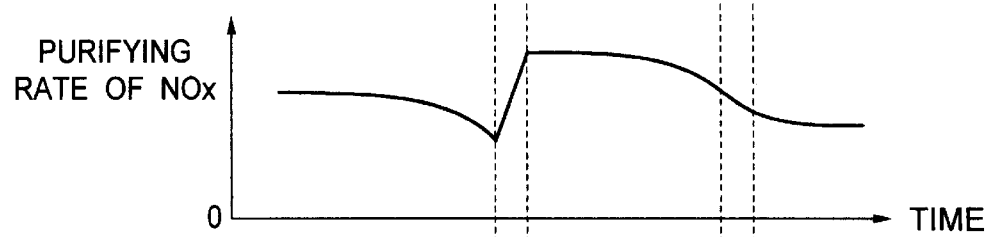
Figure 8:
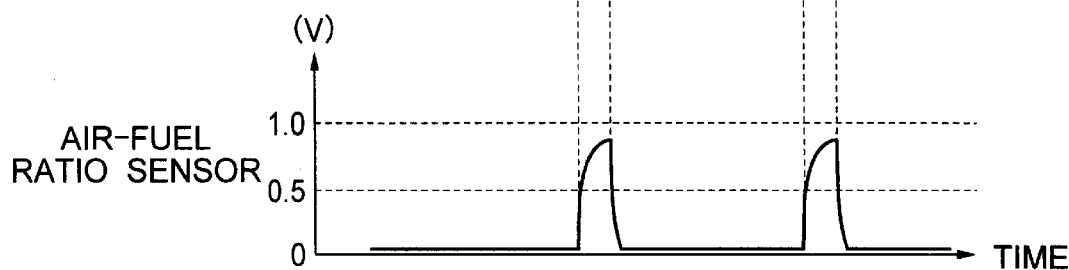
Figure 9:
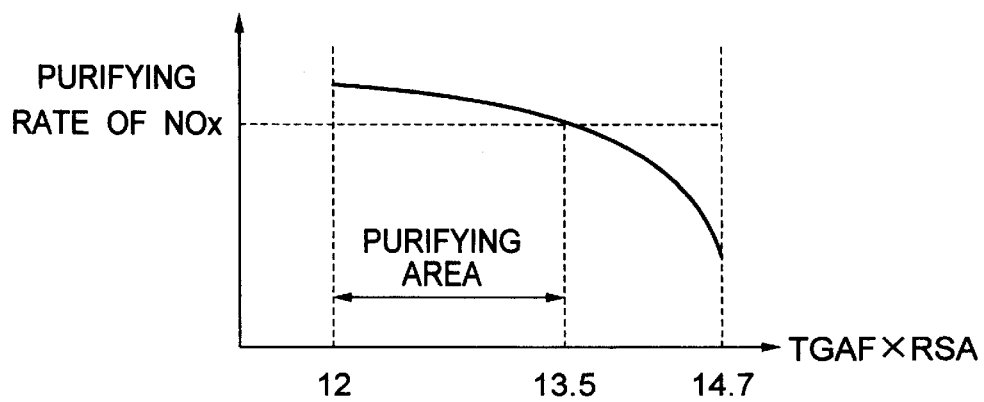
FIG. 9 is a characteristic view which shows a relation between an air-fuel ratio and an exhaust gas.
Figure 9:
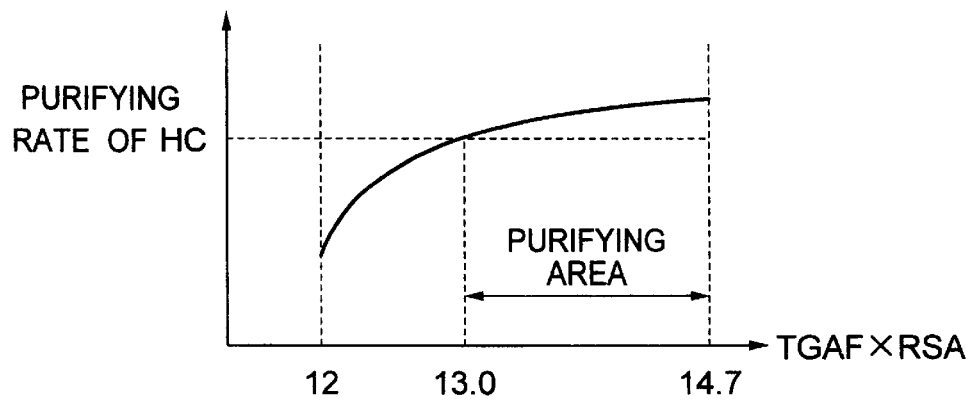

FIG. 8 shows changes of an air-fuel ratio and the like in the case of purifying the NOx trapped in the NOx trapping agent 15. In general, since the performance of trapping NOx in the NOx trapping agent 15 is deteriorated when continuing the operation in the lean air-fuel ratio, a rate of purifying NOx is deteriorated as shown in FIG. 8(2). Accordingly, as shown in FIG. 8(1), it is necessary to change the air-fuel ratio from the lean air-fuel ratio to the stoichiometric air-fuel ratio or the rich air-fuel ratio at a predetermined cycle. Hereinafter, this kind of control is called as a rich spike control, and purifying rates of HC and NOx immediately after executing the rich spike control are as shown in FIGS. 9(1) and 9(2). At a time of executing the rich spike control, since the purifying rate of NOx is bad as shown in FIG. 9(2) when setting the air-fuel ratio to the stoichiometric air-fuel ratio, that is, 14.7, it is desirable to set the air-fuel ratio to be rich in order to purify the NOx. However, when making the air-fuel ratio too rich, the purifying rate of HC becomes inversely bad as shown in FIG. 9(2). Accordingly, it is necessary to determine the target air-fuel ratio at a time of the rich spike control with considering a balance between the purifying rates of NOx and HC. An optimum value of the target air-fuel ratio is different in accordance with the operation conditions, however, in general about 13 to 13.5. At this time, a target air-fuel ratio correction modulus at the rich spike time is between 0.88 and 0.92.

However, in the case of setting the target air-fuel ratio at the rich spike control time to 13 to 13.5 as mentioned above, it is excellent for purifying NOx and HC with a good balance, however, is not desirable for diagnosing the purifying performance of the NOx trapping agent 15. The reason thereof will be described with reference to FIGS. 10 and 11.

Figure 10:
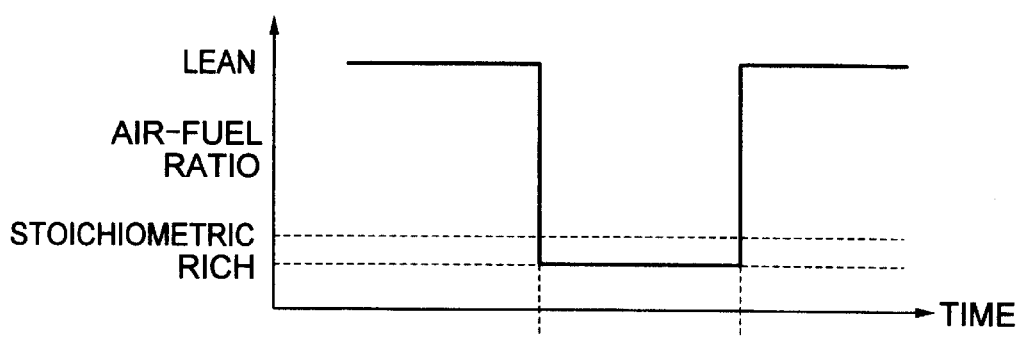
FIG. 10 is a characteristic view 1 which shows a relation between an air-fuel ratio at a time of rich spike and an air-fuel ratio sensor mounted at the rear of an NOx trapping agent.
Figure 10:
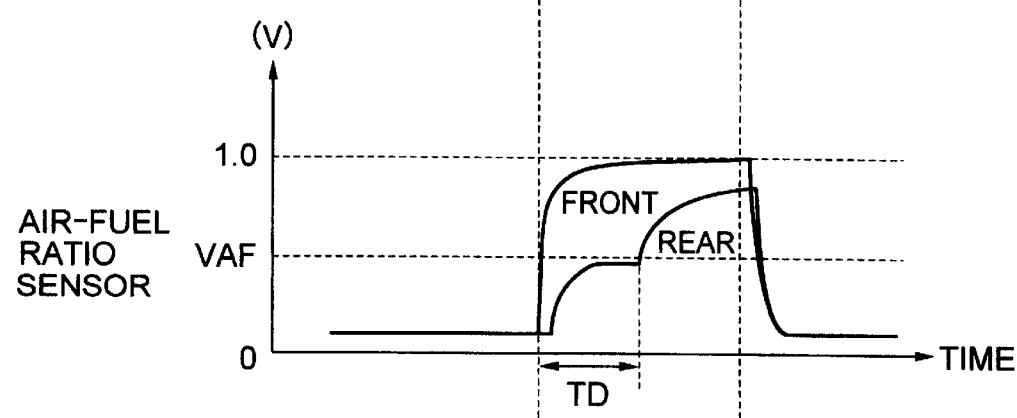
Figure 10:
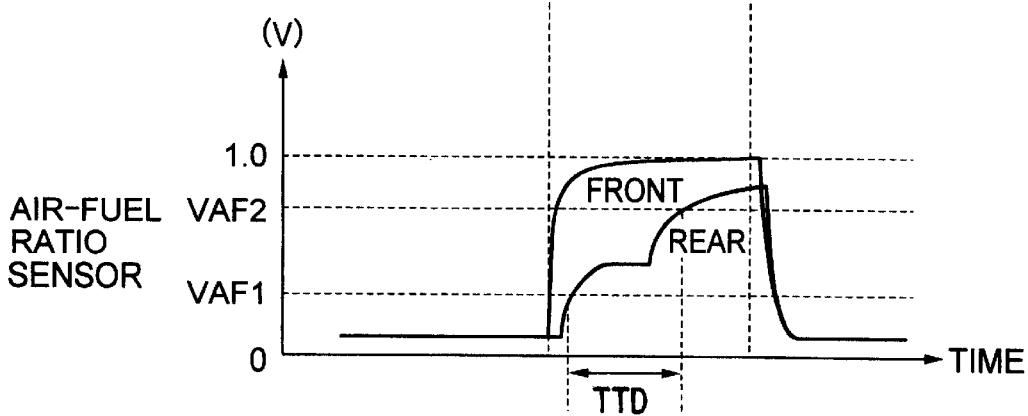

At a time of executing the rich spike control as shown in FIG. 10(1) outputs of an air-fuel sensor 14 (mounted to an upstream side of the NOx trapping agent and hereinafter referred to as a front air-fuel-ratio sensor) and an air-fuel sensor 25 (mounted to a downstream side of the NOx trapping agent and hereinafter referred to as a rear air-fuel ratio sensor) will be expressed by FIG. 10(2). Since the exhaust gas immediately after the engine becomes immediately rich in accordance with the rich spike control shown in FIG. 10(1), the output of the front air-fuel ratio sensor also shows a rich output so as to follow the rich spike control, as shown in FIG. 10(2). On the contrary, the output of the rear air-fuel ratio sensor shows a different output from the output of the front air-fuel ratio sensor due to $O_2$ ($O_2$ storage component) stored in a ceria portion of the NOx trapping agent 15 and discharged or reduced, and an oxygen $O_2$ obtained by discharging and reducing the NOx trapped in Na, Ba or the like corresponding to an alkaline (earth) metal. That is, there is seen a phenomenon that due to the influence of the $O_2$ storage component, the output of the rear air-fuel ratio sensor stands up at a slightly delayed manner, and due to the influence of the NOx purifying component, the output increase temporarily stops and thereafter again starts. In this case, in some kinds of NOx trapping agent 15, as shown in FIG. 12, there can be generated the case that no clear step appears when the output of the rear air-fuel ratio sensor starts increasing, and the output smoothly increases.

Figure 11:
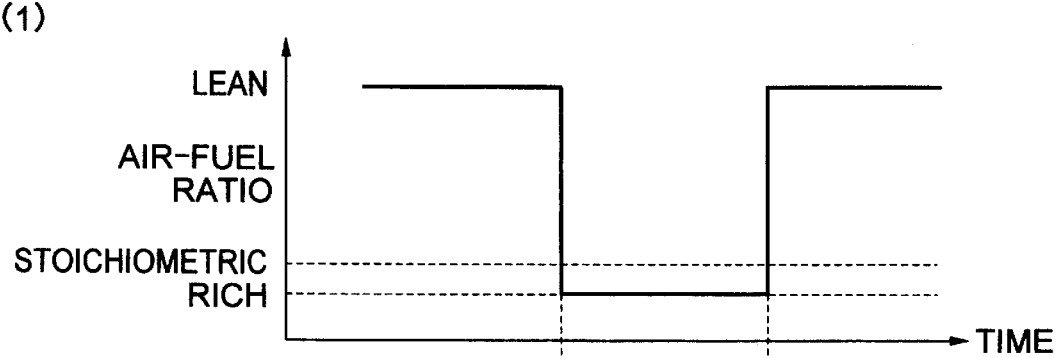
FIG. 11 is a characteristic view 2 which shows a relation between an air-fuel ratio at a time of rich spike and an exhaust gas sensor mounted at the rear of the NOx trapping agent.
Figure 11:
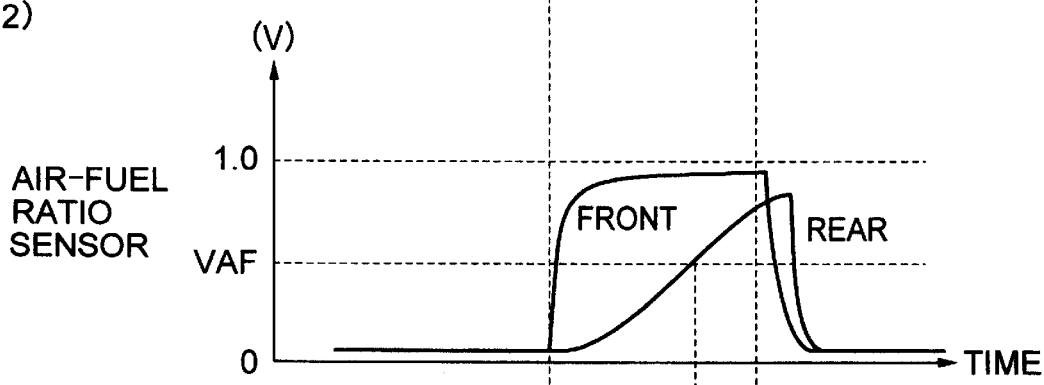
Figure 11:
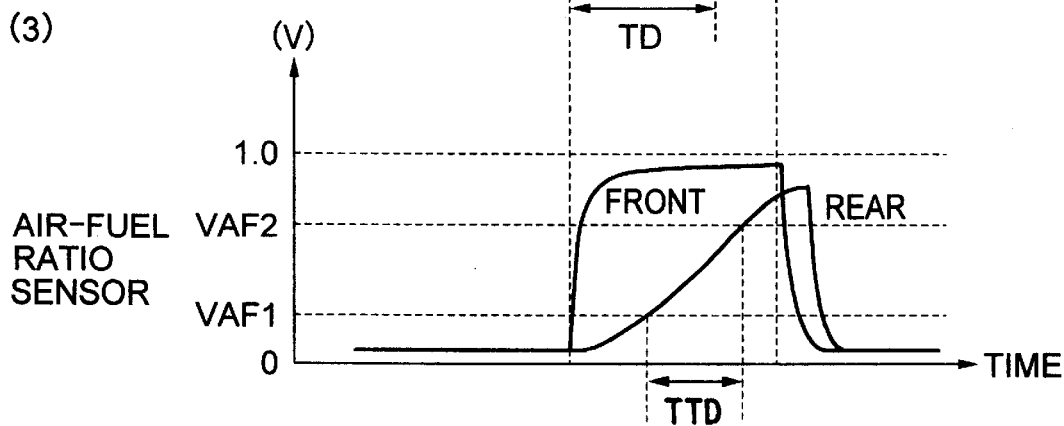

Accordingly, there can be employed a method of diagnosing a deterioration of the performance of the NOx trapping agent 15 in accordance with a magnitude of a time TD (refer to FIGS. 10 and 11(2)) required after starting the rich spike control and before the output value of the rear air-fuel ratio sensor reaches a predetermined value VAF, or a method of diagnosing a deterioration of the performance of the NOx trapping agent 15 in accordance with a magnitude of a time TTD (refer to FIGS. 10 and 11(3)) required after the output value of the rear air-fuel ratio sensor reaches a first predetermined value VAF1 and before reaching a second predetermined value VAF2.

Figure 12:
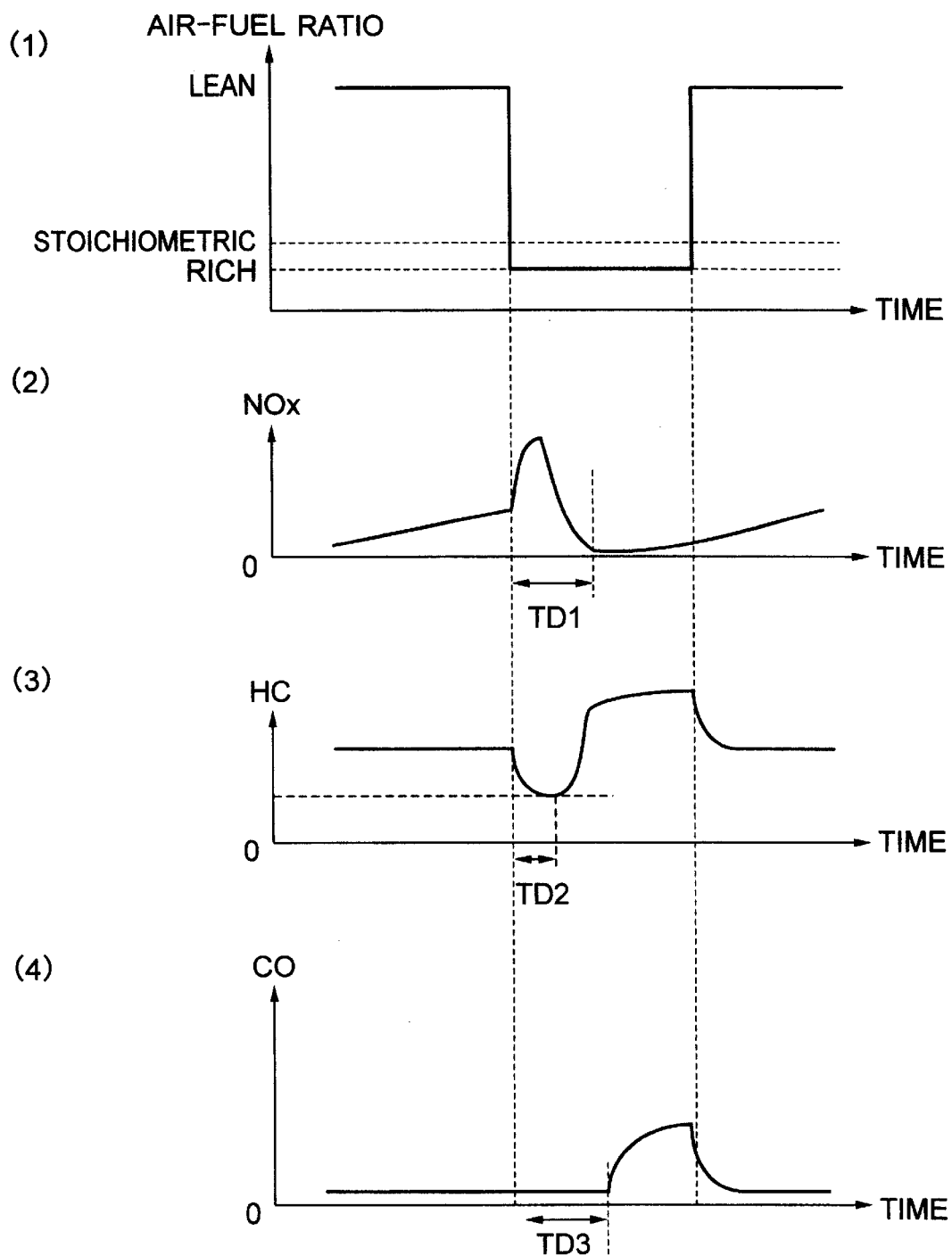
FIG. 12 is a characteristic view 3 which shows a relation between an air-fuel ratio at a time of rich spike and an air-fuel ratio sensor mounted in front of and at the rear of the NOx trapping agent.

Further, as shown in FIGS. 12(2) to 12(4), it is possible to employ a method of diagnosing a deterioration of the performance of the NOx trapping agent 15 on the basis of indexes such as NOx downstream the NOx trapping agent (a time required before reaching the minimum value after the rich spike), HC (a time required before reaching the minimum value after the rich spike), CO (a time required before reaching the maximum value after the rich spike) and the like. However, when setting the target air-fuel ratio to about 13 to 13.5 at the rich spike time, the discharge or reduction of $O_2$ due to the $O_2$ storage and the NOx purification is finished for a short time, as a result, the output of the rear air-fuel sensor immediately stands up. In the case mentioned above, it is erroneously judged that an amount of the NOx trapped in the NOx trapping agent 15 in accordance with the absorption or the adsorption is a little. Accordingly, the lean burn is returned in a state that the NOx trapped in the NOx trapping agent 15 is not completely discharged and reduced, as a result, there is a risk that the NOx is discharged or reduced to the open air and it is erroneously judged that the NOx trapping agent 15 is deteriorated in spite that the NOx trapping agent 15 is normal. It is necessary to set the air-fuel ratio upstream the NOx trapping agent at the rich spike time to be close to the stoichiometric air-fuel ratio and to a predetermined value, however, since the air-fuel ratio mentioned above is not actually feedback controlled, the air-fuel ratio is shifted from the target air-fuel ratio, so that there is a risk that it is impossible to accurately diagnose the performance of the NOx trapping agent.

In order to solve the problems mentioned above, the engine exhaust gas purifying apparatus in accordance with the present invention is characterized in that the performance of the NOx trapping agent can be effectively diagnosed by setting at least one of the target air-fuel ratio at a time of executing the rich spike control, the period for temporarily switching the air-fuel ratio from the lean air-fuel ratio to the stoichiometric air-fuel ratio or the rich air-fuel ratio and a term for temporarily changing the air-fuel ratio to the stoichiometric air-fuel ratio or the rich air-fuel ratio variable and properly setting these parameters. Hereinafter, a description will be given of a first embodiment in accordance with the present invention with reference to a flow chart shown in FIGS. 13 to 15.

Figure 13:
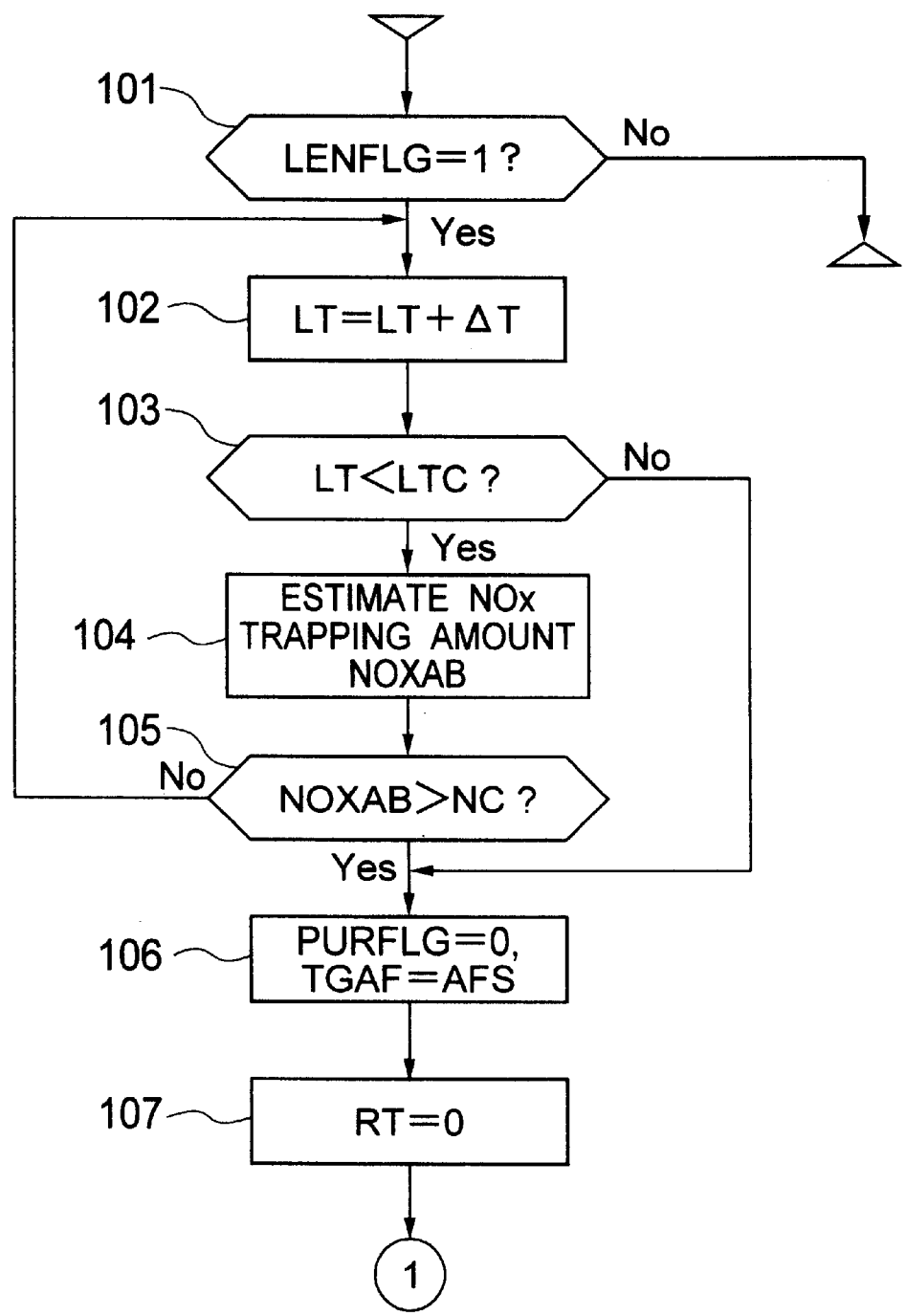
FIG. 13 is a flow chart 1 which shows a first embodiment of a method of diagnosing a deterioration of an NOx catalyst.
Figure 14:
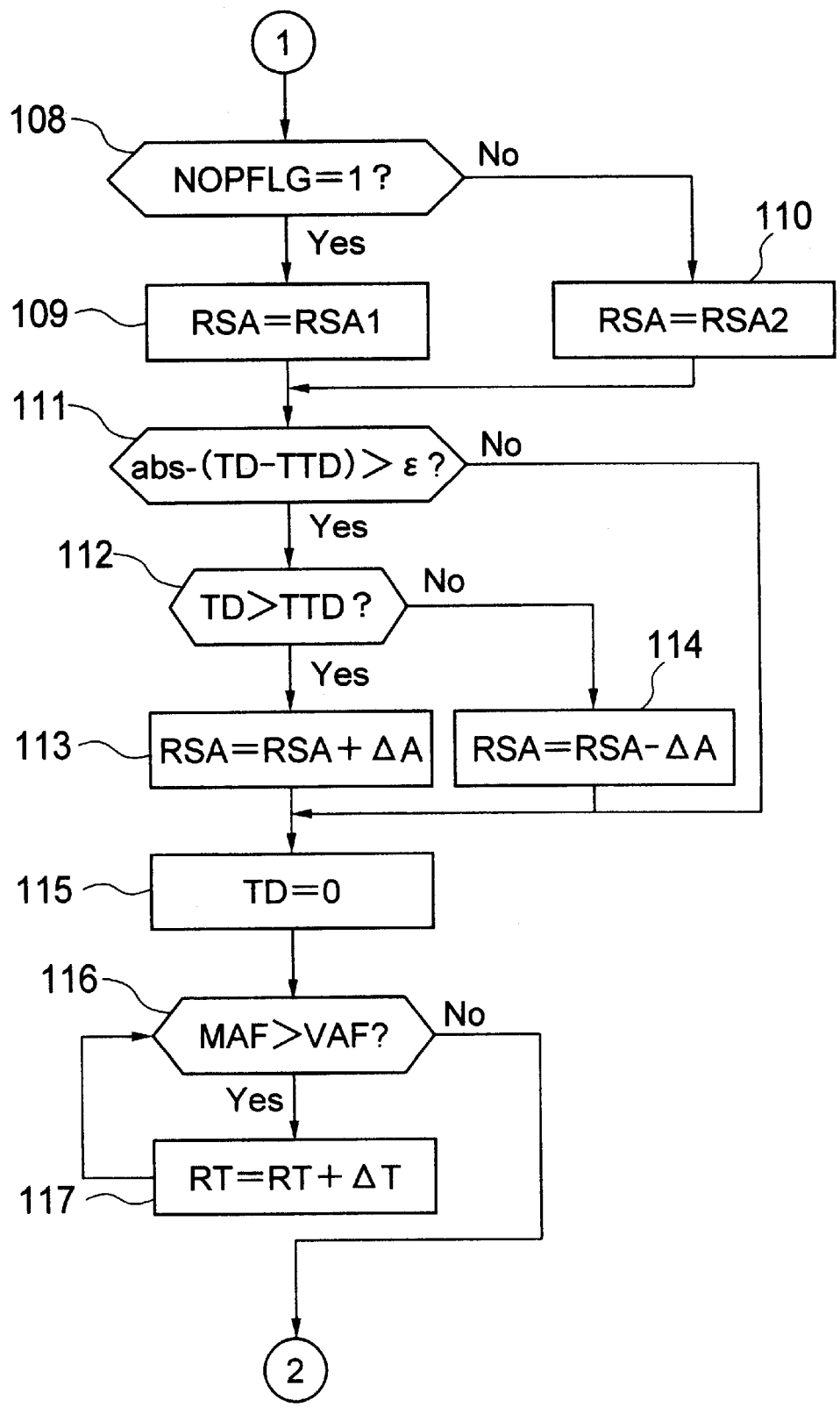
FIG. 14 is a flow chart 2 which shows a first embodiment of a method of diagnosing a deterioration of an NOx catalyst.
Figure 15:
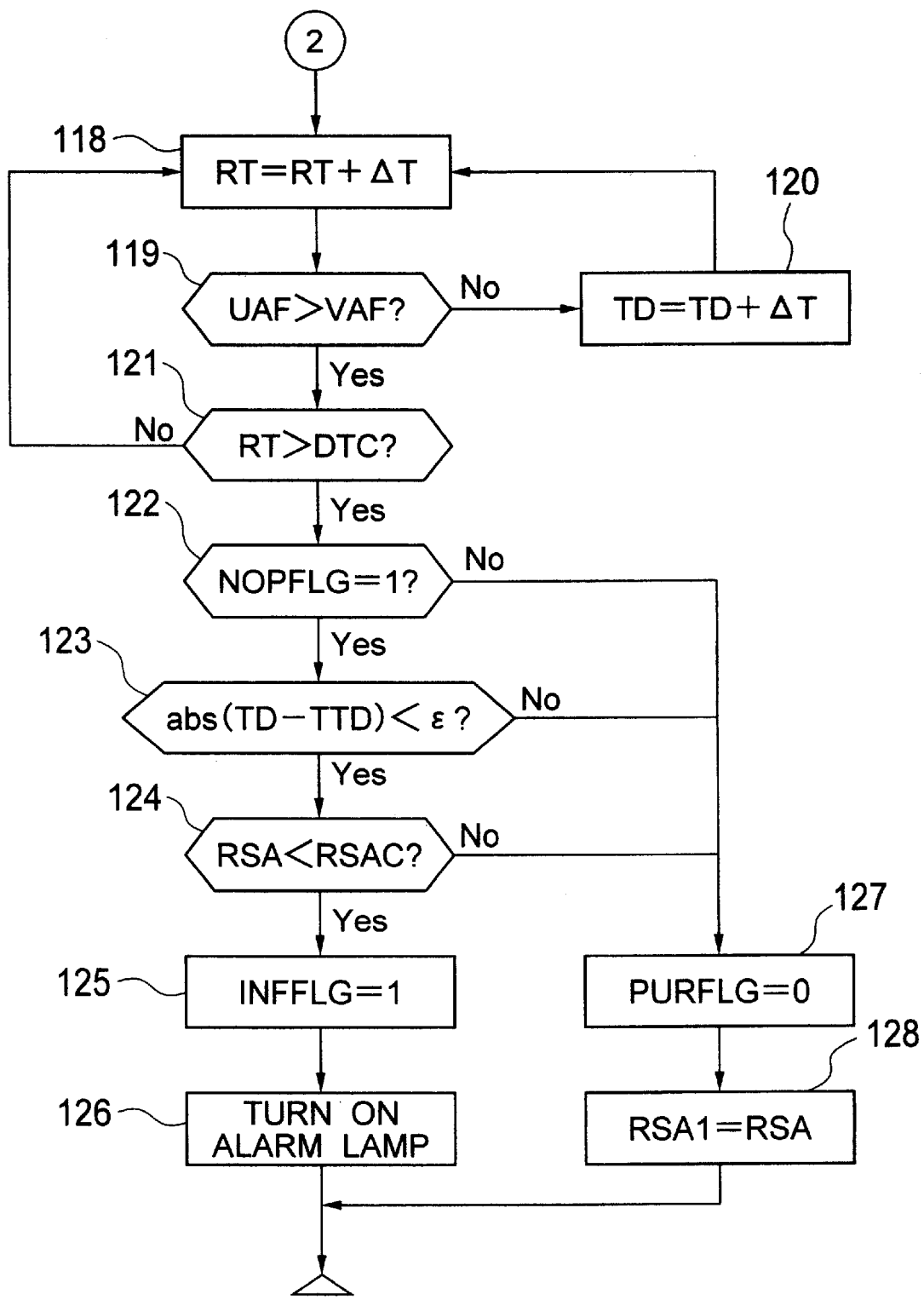
FIG. 15 is a flow chart 3 which shows a first embodiment of a method of diagnosing a deterioration of an NOx catalyst.

The flow chart in FIGS. 13 to 15 shows a flow chart for feedback controlling the target air-fuel ratio at a time of executing the rich spike control so that the time TD at which the output value of the air-fuel ratio sensor reaches the predetermined value VAF after starting the rich spike control equals to the predetermined value. Further, a flow chart in the case of feedback controlling the target air-fuel ratio at a time of executing the rich spike control so that the time difference TDD after the output value of the rear air-fuel ratio sensor reaches the first predetermined value VAF1 before reaching the second predetermined value VAF2 equals to the predetermined value has substantially the same structure. In this case, the illustrated flow chart exemplifies a flow chart for diagnosing the performance of the NOx trapping agent on the basis of the indexes of the air-fuel ratio sensor, however, it is possible to apply the same description to the case of diagnosing on the basis of the indexes of the exhaust gas sensor such as HC, CO, NOx and the like.

In a step 101, it is checked whether or not a value of the flag LENFLG expressing whether or not the current combustion state is stratified is 1. If the relation LENFLG=0 is established, a program for diagnosing the performance of the NOx trapping agent is finished. If the relation LENFLG=1 is established, the relation LT=LT+ΔT is set in a step 102 and a continuing time of the stratified operation is renewed. In a step 103, it is checked whether or not the continuing time of the stratified operation is over the predetermined time LTC. If the continuing time is equal to or more than LTC, the step goes to a step 106, the relation LENFLG=0 is set and the stratified lean operation is inhibited and switched to the uniform stoichiometric operation. On the contrary, if the continuing time is not over the value LTC, the step goes to a step 104 and an NOx trapping amount NOXAB is estimated. In a step 105, it is checked whether or not the value NOXAB reaches a certain standard value NC. If the value NOXAB is more than the standard value NC, the step goes to a step 106 and the rich spike control is executed. If the value NOXAB is equal to or less than the standard value NC, the step goes back to the step 102 and the stratified lean operation is kept.

In the step 106, the relation PURFLG=1 is set so as to generate a requirement for purifying the NOx, and the stratified lean operation is inhibited and switched to the uniform stoichiometric operation. At this time, the relation is switched to the relation TGAF=AFS (=14.7). In a step 107, a value of a variable RT expressing a passing time of the rich spike is reset. In a step 108, it is searched whether or not the relation NOPFLG=1 is established, in which NOPFLG expresses whether or not the current mode is a diagnosis mode. If the relation NOPFLG=1 is established, a value of a variable RSA expressing the target air-fuel ratio correction modulus at the rich spike time is set to RSA1 in a step 109, and when the relation NOPFLG=0 is established, the value RSA is set to RSA2 in a step 110.

In a step 111, it is checked whether or not a variable TD expressing a time after starting the rich spike control before the rear air-fuel ratio sensor reaches the predetermined value VAF equals to a predetermined value TTD previously determined with taking the operating condition such as the engine rotational speed, the torque or the like or the parameter such as the exhaust gas temperature or the like into consideration within an allowable error ϵ. As a method of determining the allowable error ϵ, a method of taking the value TTD into consideration or the like can be considered. If it is judged in the step 111 that the value TD equals to the predetermined value TTD, the step is skipped to a step 115. On the contrary, if it is judged in the step 111 that value TD is not equal to the predetermined value TTD, a magnitude between the values TD and TTD is compared in a step 112. If the relation TD<TTD is established in the step 112, in a step 113, the value RSA is ΔA increased for making the value TD longer than the preceding one so as to increase the air-fuel ratio at the rich spike control time and slightly return toward the stoichiometric air-fuel ratio. On the contrary, if the relation TD>TTD is established in the step 112, in a step 114, the value RSA is ΔA reduced for making the value TD shorter than the preceding one so as to reduce the air-fuel ratio at the rich spike control. In this case, as a method of determining the value ΔA, a method of taking an absolute value of the formula TD−TTD into consideration, for example, setting the absolute value of (TD−TTD)×c2 with employing a constant c2 can be considered.

In a step 115, the value of the variable TD is reset. In a step 116, it is searched whether or not an output value MAF of the front air-fuel ratio sensor at the current time is smaller than the predetermined value VAF. If the relation MAF<VAF is established, the step goes to a step 117, the relation RT=RT+ΔT is set, the air-fuel ratio sensor at the rear of the NOx trapping agent renews the time RT corresponding to the predetermined value, and the step again goes back to the step 116. If the relation MAF≧VAF is established, the step goes to a step 118 and the relation RT=RT+ΔT is set. In a step 119, it is searched whether or not an output value UAF of the rear air-fuel ratio sensor at the current time is smaller than the predetermined value VAF. If the relation UAF<VAF is established, the step goes to a step 120, the relation TD=TD+ΔT is set, the time TD is renewed, and the step again goes back to the step 118. If the relation UAF>VAF is established, the step goes to a step 121, and the rear air-fuel ratio sensor searches whether or not the value RT is larger than the predetermined value DTC corresponding to the predetermined time. If the relation RT>DTC is established, the step goes to a step 122, and when the relation RT≦DTC, the step goes back to the step 118. In a step 122, it is judged whether or not the relation NOPFLG=1 is established. If the relation NOPFLG=1 is established, the step goes to a step 123, and if the relation NOPFLG=0 is established, the step goes to a step 127. In the step 123, it is judged whether or not the value TD is equal to the value TTD within the allowable error ε. If it is judged that the value TD is equal to the value TTD, the step goes to a step 124, and if it is judged that the value TD is not equal to the value TTD, the step goes to the step 127. In the step 124, it is judged whether or not the air-fuel ratio correction modulus RSA at the rich spike control time is lower than the standard value RSAC. If the relation RSA<RSAC is established, the step goes to a step 125 and it is judged that the NOx trapping agent is deteriorated. Thereafter, in a step 126, an alarming lamp is turned on in order to informing a driver that the NOx trapping agent is deteriorated, and a program for diagnosing the performance of the NOx trapping agent is completed. On the contrary, if the relation RSA≧RSAC is established, the step goes to the step 127. In the step 127, the NOx purification requiring flag PURFLG is reset. In a step 128, the relation RSA1=RSA is set and the program for diagnosing the performance of the NOx trapping agent is finished.

Figure 16:
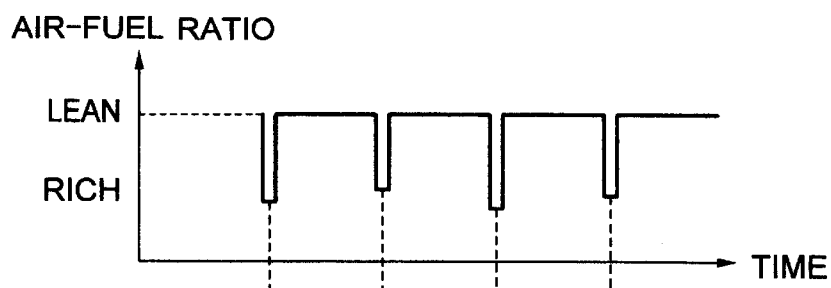
FIG. 16 is a flow chart 4 which shows a first embodiment of a method of diagnosing a deterioration of an NOx catalyst.
Figure 16:
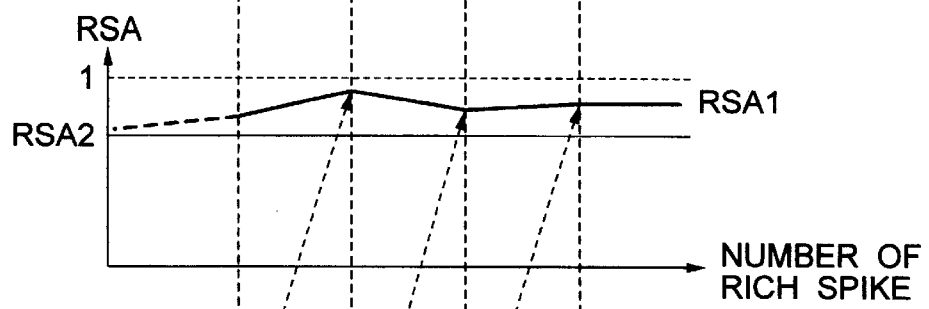
Figure 16:
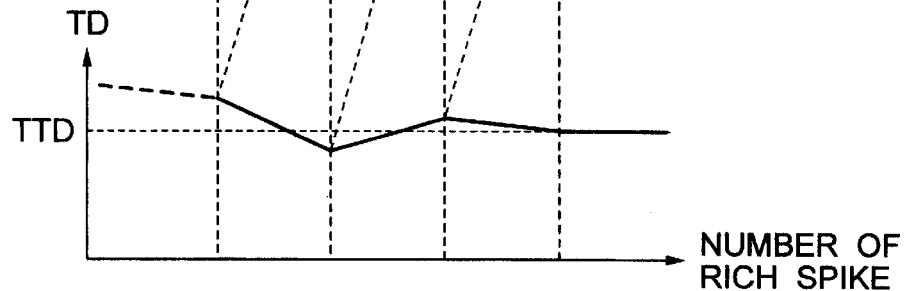

In this case, FIGS. 16(1) to 16(3) show a transition of the time TD at which the air-fuel ratio before the catalyst, the air-fuel ratio correction control modulus and the output value of the rear air-fuel ratio sensor become the predetermined values at a time of diagnosing the performance of the NOx trapping agent for the reference. In this case, in FIG. 16(2), since a value RSA2 is an air-fuel ratio correction control modulus at a normal mode in which the control of the NOx catalyst is not performed and a value RSA1 is an air-fuel ratio correction control modulus at a diagnosis mode in which the control of the NOx catalyst is performed, the relation RSA1>RSA2 is established. FIG. 16 shows that when the value TD at the preceding rich spike control time is larger, the rich spike control time air-fuel ratio correction modulus RSA is made close to 1 and the air-fuel ratio at the rich spike time is set to be close to 14.7, and when the value TD at the preceding rich spike control time is inversely smaller, the value RSA is made small and the air-fuel ratio at the rich spike time is made small.

Figure 17:
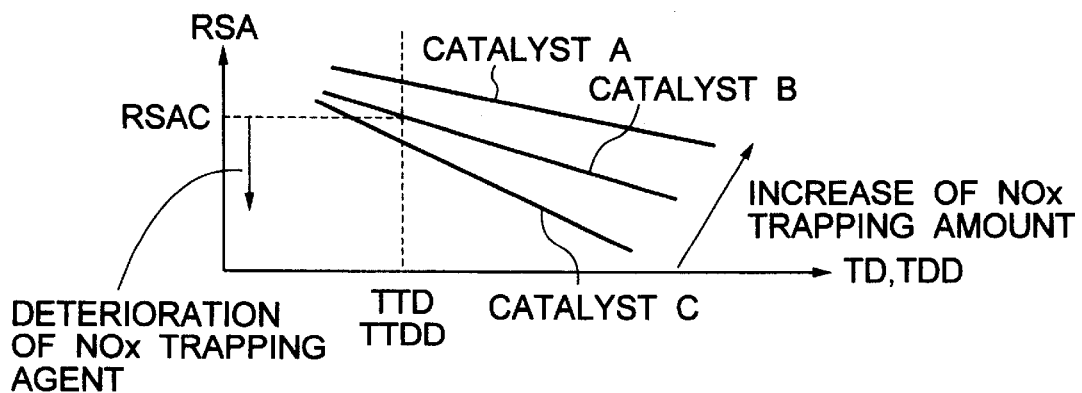
FIG. 17 is a characteristic view 1 which shows a relation between a parameter in connection with the NOx trapping agent at a time of rich spike and an air-fuel sensor mounted in front of and at the rear of the NOx trapping agent.

FIG. 17 shows a trapping performance of the NOx trapping agent when the standard value TTD of the value TD and the value RSA are given. That is, it is possible to detect that the performance of the NOx trapping agent is deteriorated at a level equal to or less than a certain RSAC when a certain TTD is given. FIG. 17 shows that the catalyst C is most deteriorated among the catalysts A, B and C.

Next, a description will be given of a second embodiment in accordance with the present invention with reference to a flow chart shown in FIGS. 18 to 20.

Figure 18:
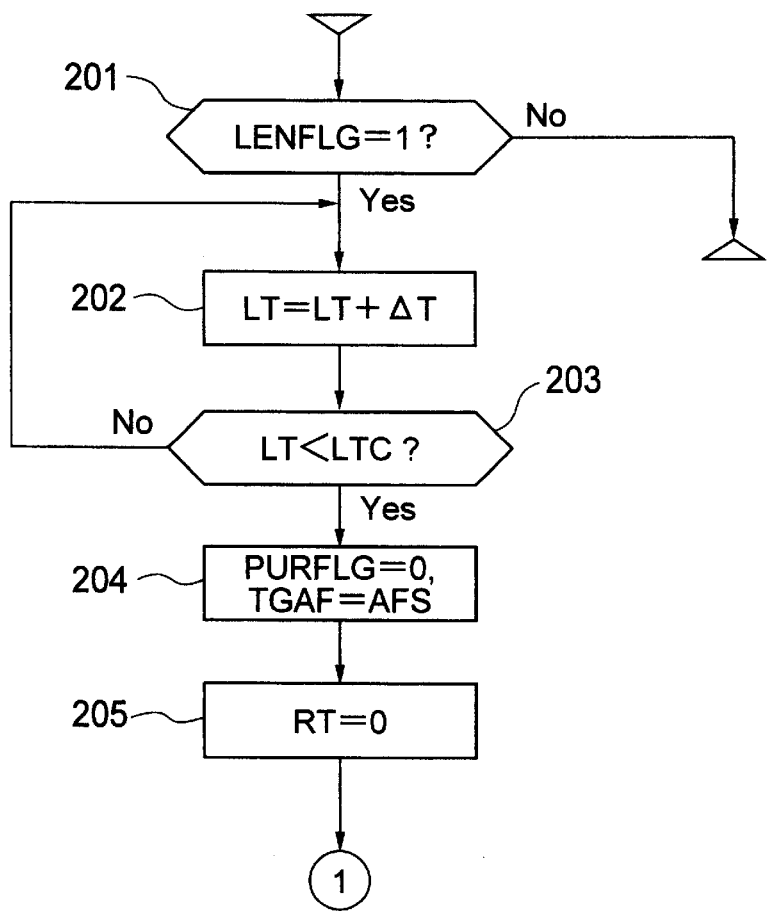
FIG. 18 is a flow chart 1 which shows a second embodiment of a method of diagnosing a deterioration of an NOx catalyst.
Figure 19:
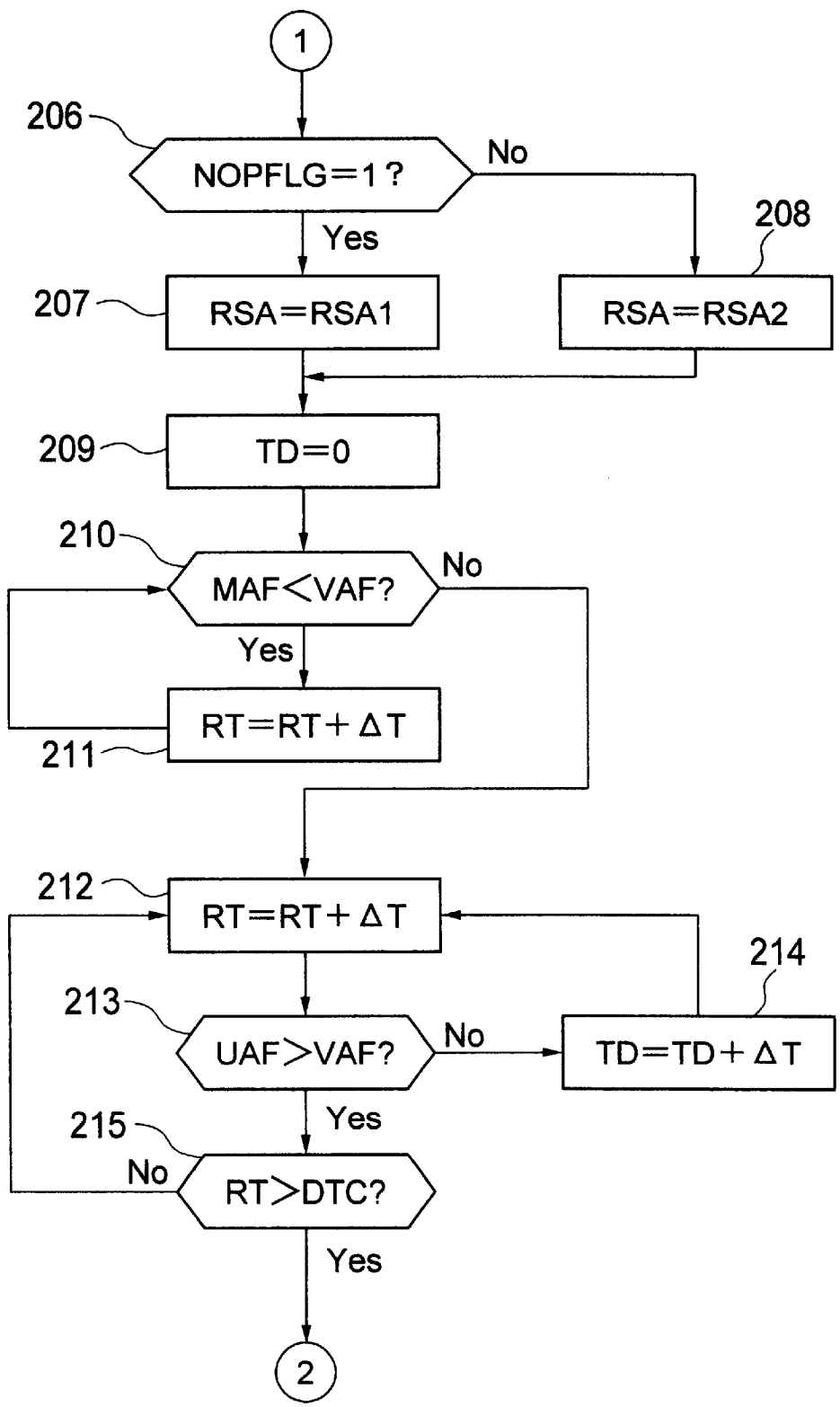
FIG. 19 is a flow chart 2 which shows a second embodiment of a method of diagnosing a deterioration of an NOx catalyst.
Figure 20:
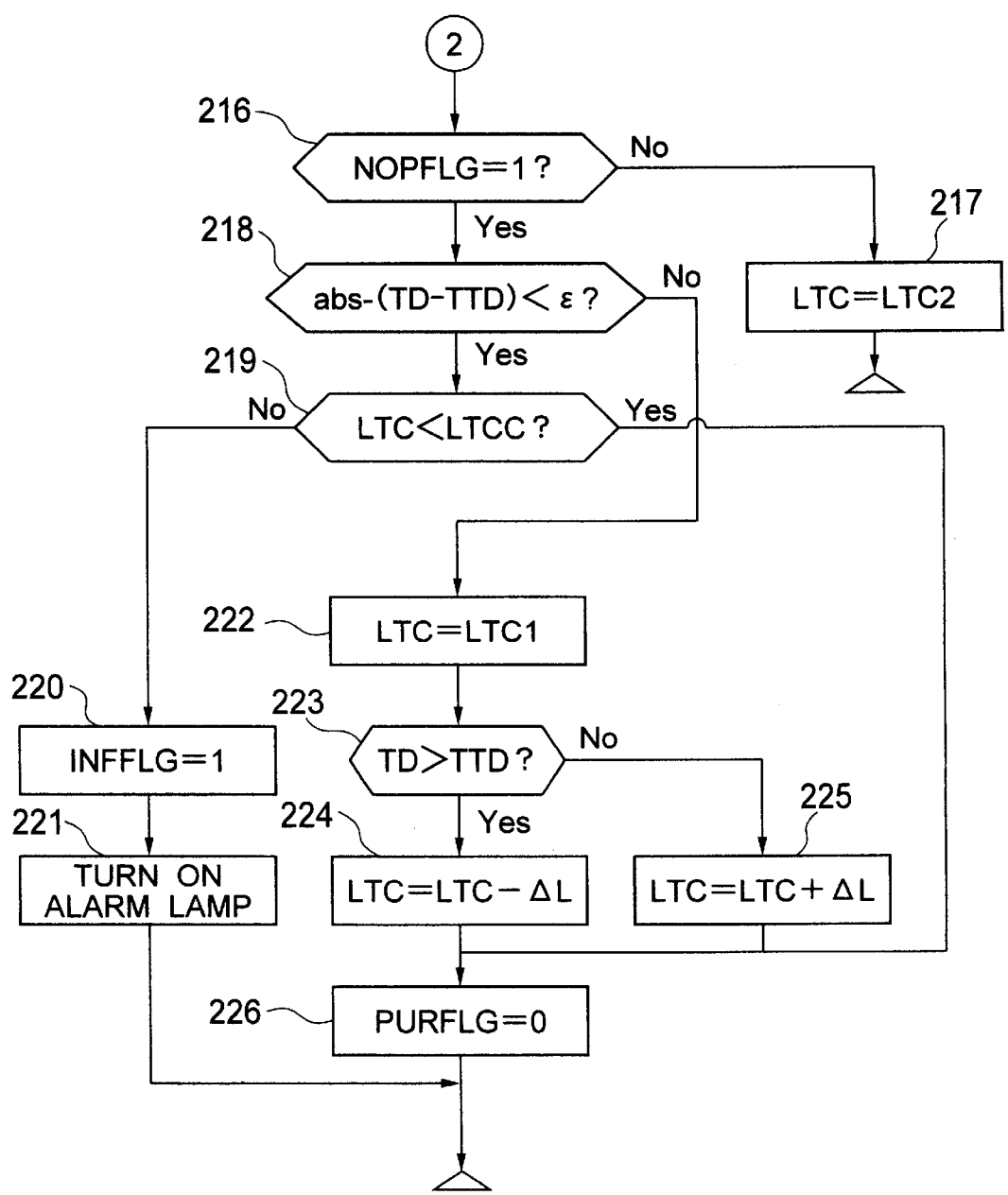
FIG. 20 is a flow chart 3 which shows a second embodiment of a method of diagnosing a deterioration of an NOx catalyst.

The flow chart in FIGS. 18 to 20 shows a flow chart for feedback controlling the target air-fuel ratio at a time of executing the rich spike control so that the time TD at which the output value of the air-fuel ratio sensor reaches the predetermined value VAF after starting the rich spike control equals to the predetermined value. Further, a flow chart in the case of feedback controlling the target air-fuel ratio at a time of executing the rich spike control so that the time difference TDD after the output value of the rear air-fuel ratio sensor reaches the first predetermined value VAF1 before reaching the second predetermined value VAF2 equals to the predetermined value has substantially the same structure. In this case, the illustrated flow chart exemplifies a flow chart for diagnosing the performance of the NOx trapping agent on the basis of the indexes of the air-fuel ratio sensor, however, it is possible to apply the same description to the case of diagnosing on the basis of the indexes of the exhaust gas sensor such as HC, CO, NOx and the like.

In a step 201, it is checked whether or not a value of the flag LENFLG expressing whether or not the current combustion state is stratified is 1. If the relation LENFLG=0 is established, a program for diagnosing the performance of the NOx trapping agent is finished. If the relation LENFLG=1 is established, the relation LT=LT+ΔT is set in a step 202 and a continuing time of the stratified operation is renewed. In a step 203, it is checked whether or not the continuing time of the stratified operation is over the predetermined time LTC. If the continuing time is equal to or more than LTC, the step goes to a step 204, the relation PURFLG=1 is set so as to generate the NOx purification requirement and the stratified lean operation is inhibited and switched to the uniform stoichiometric operation. On the contrary, if the continuing time is not over the value LTC, the step goes back to the step 202. In this case, the value LTC is employed for controlling a trapping amount of the NOx in the NOx trapping agent at the lean operation time when diagnosing the NOx trapping agent, however, in general, it is needless to say that the trapping amount of the NOx is also affected by the suction air amount, a space velocity and the like defined in accordance with the engine rotational speed, the engine torque and the like. In this case, a description will be given on the basis of assumption that all of the operation conditions defined in accordance with the engine rotational speed, the engine torque and the like are constant.

In the step 204, the relation PURFLG=0 is set, and the stratified operation is inhibited and switched to the uniform stoichiometric operation. At this time, the relation is switched to the relation TGAF=AFS (=14.7). In a step 205, a value of a variable RT expressing a passing time of the rich spike is reset. In a step 206, it is searched whether or not the relation NOPFLG=1 is established, in which NOPFLG expresses whether or not the current mode is a diagnosis mode. If the relation NOPFLG=1 is established, a value of a variable RSA expressing the target air-fuel ratio correction modulus at the rich spike time is set to RSA1 in a step 207, and when the relation NOPFLG=0 is established, the value RSA is set to RSA2 in a step 208.

In a step 209, the value of the variable TD is reset. In a step 210, it is searched whether or not an output value MAF of the front air-fuel ratio sensor at the current time is smaller than the predetermined value VAF. If the relation MAF<VAF is established, the step goes to a step 211, the relation RT=RT+ΔT is set, the air-fuel ratio sensor at the rear of the NOx trapping agent renews the time RT corresponding to the predetermined value, and the step again goes back to the step 210. If the relation MAF≧VAF is established, the step goes to a step 212 and the relation RT=RT+ΔT is set. In a step 213, it is searched whether or not an output value MAF of the front air-fuel ratio sensor at the current time is smaller than the predetermined value VAF. If the relation UAF<VAF is established, the step goes to a step 214, the relation TD=TD+ΔT is set, the time TD is renewed, and the step again goes back to the step 212. If the relation UAF>VAF is established, the step goes to a step 215, and the rear air-fuel ratio sensor searches whether or not the value RT is larger than the predetermined value DTC corresponding to the predetermined time. If the relation RT>DTC is established, the step goes to a step 216, and when the relation RT≦DTC, the step goes back to the step 212. In a step 216, it is judged whether or not the relation NOPFLG=1 is established. If the relation NOPFLG=1 is established, the step goes to a step 218, and if the relation NOPFLG=0 is established, the step goes to a step 217. In the step 217, the relation LTC=LTC2 is set and the program for diagnosing the performance of the NOx trapping agent is finished. On the contrary, if the relation NOPFLG=1 is established, the step goes to a step 218. In the step 218, it is judged whether or not the value TD is equal to the value TTD within the allowable error ε. If it is judged that the value TD is equal to the value TTD, the step goes to a step 219. On the contrary, if it is judged that the value TD is not equal to the value TTD, the step goes to the step 221 and the relation LTC=LTC1 is set. In the step 219, if the relation LTC<LTCC is established, the step goes to a step 226, the NOx purification requirement flag PURFLG is reset and the program for diagnosing the performance of the NOx trapping agent is finished. On the contrary, if the relation LTC≧LTCC is established, it is judged that the NOx trapping agent is deteriorated, the step goes to a step 220 and the relation INFFLG=1 is set. Thereafter, in a step 221, an alarming lamp is turned on in order to informing a driver that the NOx trapping agent is deteriorated, and a program for diagnosing the performance of the NOx trapping agent is completed. In a step 222, a relation of magnitude between the values TD and TTD is compared. If the relation TD>TTD is established, the step goes to a step 223 so as to reduce the value LTCC corresponding to a threshold of the value LTC and set the relation LTCC=LTCC−ΔL. On the contrary, if the relation TD≦TTD is established, the step goes to a step 224 so as to increase the value LTCC corresponding to the threshold of the value LTC and set the relation LTCC=LTCC−ΔL. Thereafter, the step goes to a step 226, the NOx purification requiring flag PURFLG is reset, and the program for diagnosing the performance of the NOx trapping agent is finished.

Figure 21:
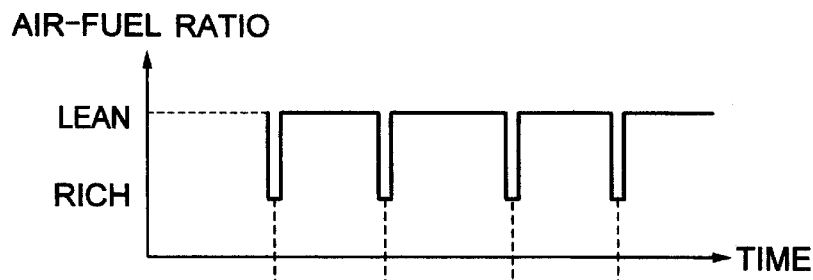
FIG. 21 is a flow chart 4 which shows a second embodiment of a method of diagnosing a deterioration of an NOx catalyst.
Figure 21:
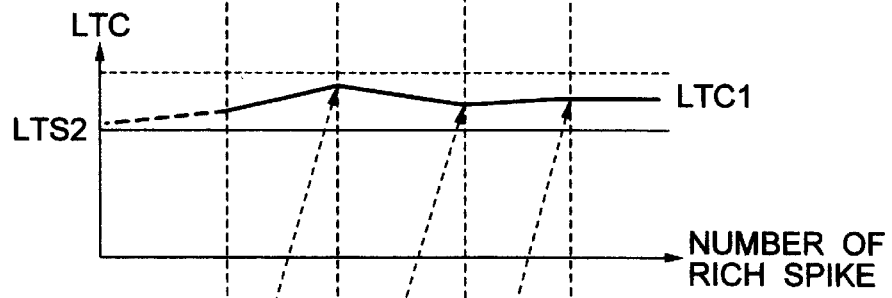
Figure 21:
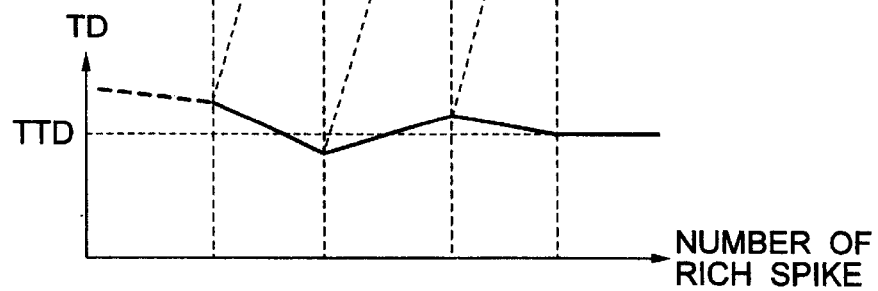

In this case, FIGS. 21(1) to 21(3) show a transition of the time TD at which the air-fuel ratio before the catalyst, the air-fuel ratio correction control modulus and the output value of the rear air-fuel ratio sensor become the predetermined values at a time of diagnosing the performance of the NOx trapping agent for the reference. In this case, in FIG. 21(2), since a value LTS2 is a rich spike control cycle at a normal mode in which the control of the NOx catalyst is not performed and a value LTS1 is a rich spike control cycle at a diagnosis mode in which the control of the NOx catalyst is performed, the relation LTS1>LTS2 is established. FIG. 21 shows that when the value TD at the preceding rich spike control time is larger, the value LTS is made large so as to increase the trapping amount of the NOx trapped in the NOx trapping agent, and when the value TD at the preceding rich spike control time is inversely smaller, the value LTS is made small so as to reduce the trapping amount of the NOx trapped in the NOx trapping agent.

Figure 22:
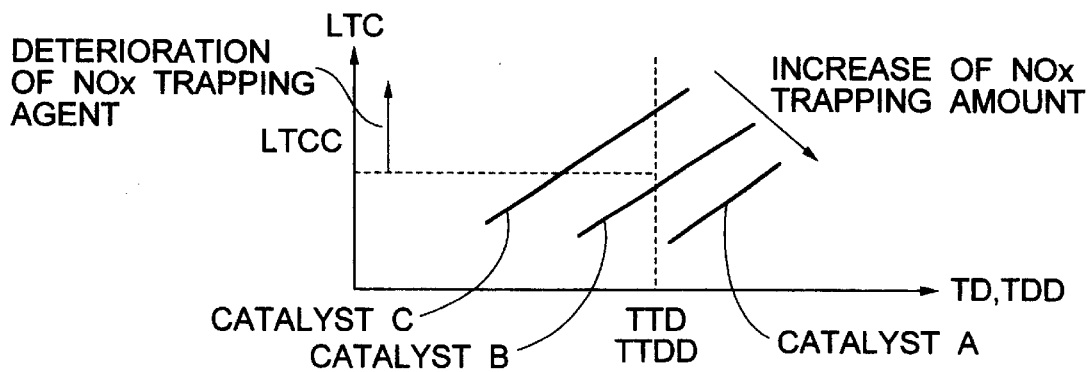
FIG. 22 is a characteristic view 2 which shows a relation between a parameter in connection with the NOx trapping agent at a time of rich spike and an air-fuel sensor mounted in front of and at the rear of the NOx trapping agent.

FIG. 22 shows a trapping performance of the NOx trapping agent when the standard value TTD of the value TD and the value LTC are given. That is, it is possible to detect that the performance of the NOx trapping agent is deteriorated at a level equal to or more than a certain LTCC when a certain TTD is given. FIG. 22 shows that the catalyst C is most deteriorated among the catalysts A, B and C.

Figure 23:
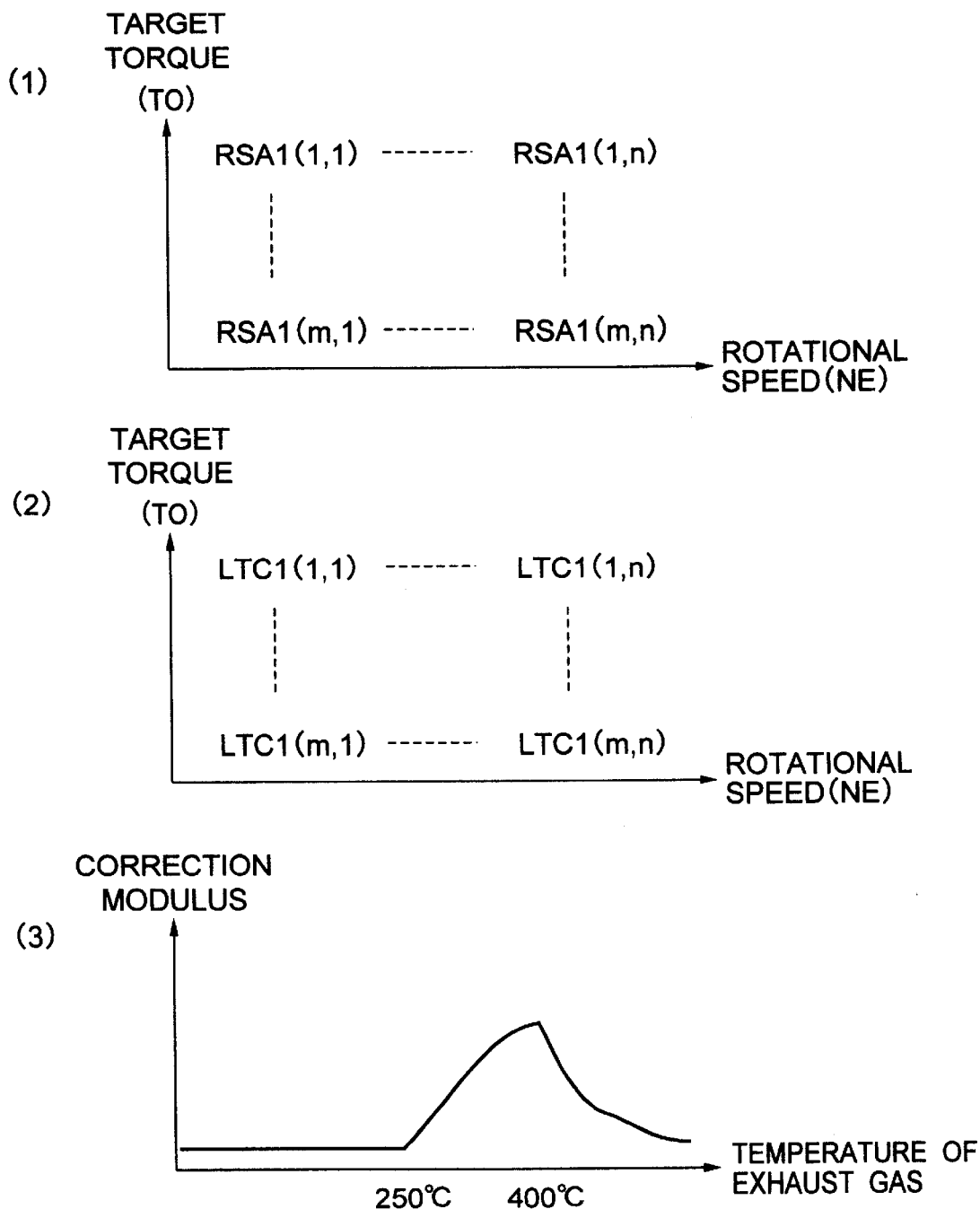
FIG. 23 is a map which shows a control parameter of air-fuel ratio changing means and a view of a relation between a temperature of an exhaust gas and a correction modulus of the control parameter.

FIG. 23 shows an embodiment of a method of defining the values RSA1 and LTC1 mentioned above in accordance with the parameter expressed by the operation condition such as the torque, the engine rotational speed and the like, or the temperature of the exhaust gas. In FIGS. 23(1) and 23(2), the values RSA1 and LTC1 are given by a map of the torque and the engine rotational speed, however, the values can be given by the indexes such as the suction air amount, the fuel injection pulse width, the throttle opening degree and the like. Further, FIG. 23(3) shows a correction modulus in the case of taking the temperature of the exhaust gas into consideration, and it is preferable to employ a method of multiplying the predetermined value determined by FIG. 23(1) or the like. That is, a consideration is given to a fact that when the temperature of the exhaust gas immediately before the NOx trapping agent becomes equal to or more than 250° C., the NOx trapping agent starts activating and until about 400° C., the higher the temperature of the exhaust gas becomes, the more the NOx trapping agent is activated.

As mentioned above, the embodiments in accordance with the present invention are described with exemplifying the cylinder internal injection (DI) type engine, however, the present invention can be realized even in a so-called lean burn engine of a suction manifold pipe injection type.

In accordance with the present invention, it is possible to more accurately detect a degree of deterioration with respect to the NOx trapping performance with using the indexes such as the output value of the air-fuel sensor at the rear of the NOx trapping agent by feedback controlling the control parameter such as the air-fuel ratio or the like in front of the NOx trapping agent.

Further, in accordance with the present invention, it is possible to quickly perform a diagnosis of the NOx catalyst by determining the parameter such as the air-fuel ratio at the rich spike control or the like on the basis of the operation state of the engine so that the threshold employed for comparing with the time for the completion of the discharge or reduction of the NOx trapped in the NOx trapping agent in accordance with the absorption, the adsorption or the like.

What is claimed is:

1. An engine exhaust gas purifying apparatus comprising:

an NOx trapping agent arranged within an exhaust gas passage, trapping an NOx in an exhaust gas in accordance with an adsorption or an absorption when an air-fuel ratio in the exhaust gas is lean and discharging or reducing the NOx when the air-fuel ratio is a stoichiometric air-fuel ratio or the rich air-fuel ratio;

air-fuel ratio changing means temporarily changing the air-fuel ratio of the exhaust gas from the lean air-fuel ratio to the stoichiometric air-fuel ratio or the rich air-fuel ratio at a predetermined cycle;

particular component detecting means detecting a particular component in the exhaust gas downstream said NOx trapping agent;

NOx discharge or reduction completion judging means judging on the basis of a detecting result of said particular component detecting means at a time of temporarily changing the air-fuel ratio of the exhaust gas to the stoichiometric air-fuel ratio or the rich air-fuel ratio by said air-fuel ratio changing means that a discharge or reduction of the NOx trapped by said NOx trapping agent is completed; and NOx discharge or reduction completion time detecting means detecting a time required for purifying the NOx, wherein a control parameter of said air-fuel ratio changing means is changed on the basis of a result obtained by comparing a time (TD) detected by the NOx discharge or reduction completion time detecting means with a predetermined value (TTD) previously set; and wherein a difference between the values TD and TTD is made small at a time of changing the control parameter of said air-fuel ratio changing means on the basis of the result of comparison between said detected time TD and the predetermined value TTD.

2. An engine exhaust gas purifying apparatus as claimed in claim 1, wherein said particular component detecting means detects any of a concentration of oxygen, NOx, HC and CO.

3. An engine exhaust gas purifying apparatus as claimed in claim 1, wherein as the control parameter of said air-fuel ratio changing means, at least one of an air-fuel ratio at a time of temporarily changing to the stoichiometric air-fuel ratio or the rich air-fuel ratio, a cycle for temporarily changing the air-fuel ratio from the lean air-fuel ratio to the stoichiometric air-fuel ratio or the rich air-fuel ratio and a term for temporarily changing the air-fuel ratio to the stoichiometric air-fuel ratio or the rich air-fuel ratio is made variable.

4. An engine exhaust gas purifying apparatus as claimed in claim 1, wherein a time that the detected value detected by said particular component detecting means is smaller than the predetermined value is defined as said NOx discharge or reduction completion time.

5. An engine exhaust gas purifying apparatus as claimed in claim 1, wherein a time that the detected value detected by said particular component detecting means is smaller than a first predetermined value and larger than a second predetermined value is defined as said NOx discharge or reduction completion time.

6. An engine exhaust gas purifying apparatus as claimed in claim 1, wherein a deterioration of said NOx trapping agent is detected on the basis of the value of the control parameter of said air-fuel ratio changing means.

7. An engine exhaust gas purifying apparatus as claimed in claim 6, further comprising at least one of storing means for storing a code expressing a deterioration of said NOx trapping agent when a detected deterioration of said NOx trapping agent is equal to or more than a predetermined value, and alarm generating means for generating an alarm.

8. An engine exhaust gas purifying apparatus as claimed in claim 6, wherein a lean operation is limited in correspondence to said detected deterioration of the NOx trapping agent.

9. An engine exhaust gas purifying apparatus comprising:
an NOx trapping agent arranged within an exhaust gas passage, trapping an NOx in an exhaust gas in accordance with an adsorption or an absorption when an air-fuel ratio in the exhaust gas is lean and discharging or reducing the NOx when the air-fuel ratio is a stoichiometric air-fuel ratio or the rich air-fuel ratio;
air-fuel ratio changing means temporarily changing the air-fuel ratio of the exhaust gas from the lean air-fuel ratio to the stoichiometric air-fuel ratio or the rich air-fuel ratio at a predetermined cycle;
particular component detecting means detecting a particular component in the exhaust gas downstream said NOx trapping agent;
NOx discharge or reduction completion judging means judging on the basis of a detecting result of said particular component detecting means at a time of temporarily changing the air-fuel ratio of the exhaust gas to the stoichiometric air-fuel ratio or the rich air-fuel ratio by said air-fuel ratio changing means that a discharge or reduction of the NOx trapped by said NOx trapping agent is completed; and
NOx discharge or reduction completion time detecting means detecting a time required for purifying the NOx, wherein the engine exhaust gas purifying apparatus further comprises NOx trapping agent performance judging means for judging a performance of the NOx trapping agent on the basis of a result obtained by comparing a time (TD) detected by the NOx discharge or reduction completion time detecting means with a predetermined value (TTD) previously set, and a control parameter of said air-fuel ratio changing means is previously set on the basis of a parameter indicating an operating state of the engine; and wherein a difference between the values TD and TTD is made small at a time of changing the control parameter of said air-fuel ratio changing means on the basis of the result of comparison between said detected time TD and the predetermined value TTD.

10. An engine exhaust gas purifying apparatus as claimed in claim 9 wherein the control parameter of said air-fuel ratio changing means is set so that said predetermined value TTD becomes a fixed value without relation to an operating state.

11. An engine exhaust gas purifying apparatus as claimed in claim 9, wherein said particular component detecting means detects any of a concentration of oxygen, NOx, HC and CO.

12. An engine exhaust gas purifying apparatus as claimed in claim 9, wherein as the control parameter of said air-fuel ratio changing means, at least one of an air-fuel ratio at a time of temporarily changing to the stoichiometric air-fuel ratio or the rich air-fuel ratio, a cycle for temporarily changing the air-fuel ratio from the lean air-fuel ratio to the stoichiometric air-fuel ratio or the rich air-fuel ratio and a term for temporarily changing the air-fuel ratio to the stoichiometric air-fuel ratio or the rich air-fuel ratio is made variable.

13. An engine exhaust gas purifying apparatus as claimed in claim 9, wherein a time that the detected value detected by said particular component detecting means is smaller than the predetermined value is defined as said NOx discharge or reduction completion time.

14. An engine exhaust gas purifying apparatus as claimed in claim 9, wherein a time that the detected value detected by said particular component detecting means is smaller than a first predetermined value and larger than a second predetermined value is defined as said NOx discharge or reduction completion time.

15. An engine exhaust gas purifying apparatus comprising:
an NOx trapping agent arranged within an exhaust gas passage, trapping an NOx in an exhaust gas in accordance with an adsorption or an absorption when an air-fuel ratio in the exhaust gas is lean and discharging or reducing the NOx when the air-fuel ratio is a stoichiometric air-fuel ratio or the rich air-fuel ratio;
air-fuel ratio changing means temporarily changing the air-fuel ratio of the exhaust gas from the lean air-fuel ratio to the stoichiometric air-fuel ratio or the rich air-fuel ratio at a predetermined cycle;
particular component detecting means detecting a particular component in the exhaust gas downstream said NOx trapping agent;
NOx discharge or reduction completion judging means judging on the basis of a detecting result of said particular component detecting means at a time of temporarily changing the air-fuel ratio of the exhaust gas to the stoichiometric air-fuel ratio or the rich air-fuel ratio by said air-fuel ratio changing means that a discharge or reduction of the NOx trapped by said NOx trapping agent is completed; and NOx discharge or reduction completion time detecting means detecting a time required for purifying the NOx, wherein a control parameter of said air-fuel ratio changing means is changed on the basis of a result obtained by comparing a time (TD) detected by the NOx discharge or reduction completion time detecting means with a predetermined value (TTD) previously set; and wherein a time that the detected value detected by said particular component detecting means is smaller than a first predetermined value and larger than a second predetermined value is defined as said NOx discharge or reduction completion time.

16. An engine exhaust gas purifying apparatus comprising:

an NOx trapping agent arranged within an exhaust gas passage, trapping an NOx in an exhaust gas in accordance with an adsorption or an absorption when an air-fuel ratio in the exhaust gas is lean and discharging or reducing the NOx when the air-fuel ratio is a stoichiometric air-fuel ratio or the rich air-fuel ratio;

air-fuel ratio changing means temporarily changing the air-fuel ratio of the exhaust gas from the lean air-fuel ratio to the stoichiometric air-fuel ratio or the rich air-fuel ratio at a predetermined cycle;

particular component detecting means detecting a particular component in the exhaust gas downstream said NOx trapping agent;

NOx discharge or reduction completion judging means judging on the basis of a detecting result of said particular component detecting means at a time of temporarily changing the air-fuel ratio of the exhaust gas to the stoichiometric air-fuel ratio or the rich air-fuel ratio by said air-fuel ratio changing means that a discharge or reduction of the NOx trapped by said NOx trapping agent is completed; and NOx discharge or reduction completion time detecting means detecting a time required for purifying the NOx, wherein the engine exhaust gas purifying apparatus further comprises NOx trapping agent performance judging means for judging a performance of the NOx trapping agent on the basis of a result obtained by comparing a time (TD) detected by the NOx discharge or reduction completion time detecting means with a predetermined value (TTD) previously set, and a control parameter of said air-fuel ratio changing means is previously set on the basis of a parameter indicating an operating state of the engine; and wherein a time that the detected value detected by said particular component detecting means is smaller than a first predetermined value and larger than a second predetermined value is defined as said NOx discharge or reduction completion time.

* * * * *